(12) United States Patent
Huang et al.

(10) Patent No.: US 12,535,455 B2
(45) Date of Patent: Jan. 27, 2026

(54) MICRO-FLUIDIC DETECTION DEVICE

(71) Applicant: Shanghai Tianma Micro-electronics Co., Ltd., Shanghai (CN)

(72) Inventors: Yukun Huang, Shanghai (CN); Shun Gong, Shanghai (CN); Haotian Lu, Shanghai (CN); Linzhi Wang, Shanghai (CN); Kaidi Zhang, Shanghai (CN); Baiquan Lin, Shanghai (CN); Kerui Xi, Shanghai (CN); Feng Qin, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 175 days.

(21) Appl. No.: 18/613,167

(22) Filed: Mar. 22, 2024

(65) Prior Publication Data
US 2025/0085253 A1 Mar. 13, 2025

(30) Foreign Application Priority Data
Sep. 7, 2023 (CN) .......................... 202311152883.3

(51) Int. Cl.
*G01N 27/414* (2006.01)
*B01L 3/00* (2006.01)

(52) U.S. Cl.
CPC ...... *G01N 27/414* (2013.01); *B01L 3/502715* (2013.01); *B01L 2300/0645* (2013.01); *B01L 2300/0874* (2013.01); *B01L 2300/12* (2013.01); *B01L 2300/165* (2013.01)

(58) Field of Classification Search
CPC ..... B01L 2300/0645; B01L 2300/0874; B01L 2300/12; B01L 2300/165; B01L 2400/0427; B01L 3/502715; B01L 3/502792; G01N 27/414; G01N 27/4145; Y02P 20/52
See application file for complete search history.

(56) References Cited

U.S. PATENT DOCUMENTS

2021/0339254 A1* 11/2021 Wang ................ B01L 3/502792
2022/0111387 A1*  4/2022 Paolini, Jr. ........ B01L 3/502792

FOREIGN PATENT DOCUMENTS

CN           114126760 A       3/2022

* cited by examiner

*Primary Examiner* — Gurpreet Kaur
(74) *Attorney, Agent, or Firm* — Anova Law Group, PLLC

(57) ABSTRACT

A micro-fluidic detection device includes a first base plate, a second base plate opposite to the first base plate, and a droplet travel layer located between the first and second base plates. The first base plate includes a first substrate, a drive array layer, a first electrode layer, and a first hydrophobic layer. The second base plate includes a second substrate, a second electrode layer, and a second hydrophobic layer. Drive electrodes of the first electrode layer are at first units. The first unit includes a micro-fluidic unit circuit. A second unit includes a detection unit circuit. The detection unit circuit includes inorganic transistors and organic transistors. A sensitive electrode is at the second unit. The sensitive electrode is on a side of a layer where the inorganic transistor is located away from the first substrate. A first hollow hole of the first base plate exposes the sensitive electrode.

20 Claims, 15 Drawing Sheets

MICRO-FLUIDIC DETECTION DEVICE

CROSS-REFERENCE TO RELATED APPLICATION

This application claims the priority of Chinese Patent Application No. 202311152883.3, filed on Sep. 7, 2023, the content of which is incorporated herein by reference in its entirety.

TECHNICAL FIELD

The present disclosure generally relates to the field of micro-fluidic technology and, more particularly, relates to micro-fluidic detection devices.

BACKGROUND

Micro-fluidic technology mainly involves in manipulation of fluids in micrometer or smaller scales. With advantages of easy fluid operation, high monodispersity, miniaturization, low cost, high sensitivity, and high throughput, micro-fluidic technology has intersected with chemistry, biology, engineering, physics, and other disciplines, showing a wide range of application prospects. Applications of micro-fluidic droplet technology mainly lie in the control of droplets, such as performing functions of splitting, merging, mixing, and sorting droplets. Therefore, micro-fluidic technology has broad prospects for applications in many fields such as biomedical research, drug synthesis and screening, environmental monitoring and protection, health quarantine, forensic identification, and detection of biological reagents.

To adapt to multiple samples, rapid detection, and reduction of manual operations, various fully automatic micro-fluidic detectors are developed. The automated instruments reduce manual operations, liberate labor, and eliminate subjective errors in experiments. Existing biomolecular microarray chips generally separate reaction and detection processes. That is, droplets that have completed reaction functions such as splitting, merging, mixing, and sorting are detected to get concentration and other data in detection devices. For example, the current field of on-site rapid detection of biomolecules (nucleic acids) is mainly based on timed fluorescence quantitative polymerase chain reaction or rolling circle amplification technology. The technology still belongs to the category of biological experimental methods, and is difficult to achieve accurate quantitative detection of multiple indicators. Moreover, there are problems such as a large demand for testing samples, expensive equipment, large volume, and complicated operations.

Thus, it is desirable to provide a micro-fluidic detection device that can not only realize fixed-point, timed, quantitative biological reactions and accurate detection, but also help reduce the demand for samples, save costs, shorten detection time, and improve detection efficiency and accuracy.

The disclosed structures and methods are directed to at least partially alleviate one or more problems set forth above and to solve other problems in the art.

SUMMARY

One aspect of the present disclosure provides a micro-fluidic detection device that includes a first base plate, a second base plate opposite to the first base plate, and a droplet travel layer located between the first and second base plates. The first base plate at least includes a first substrate, a drive array layer, a first electrode layer, and a first hydrophobic layer. The drive array layer is located on a side of the first substrate facing the second base plate. The first electrode layer is located on a side of the drive array layer facing the second base plate. The first hydrophobic layer is located on the side of the drive array layer facing the second base plate. The second base plate at least includes a second substrate, a second electrode layer, and a second hydrophobic layer. The second electrode layer is located on a side of the second substrate facing the first base plate. The second hydrophobic layer is located on a side of the second electrode layer facing the first base plate. The micro-fluidic detection device further includes multiple first units and multiple second units. The first electrode layer at least includes multiple drive electrodes. The drive electrodes are at the first units. The first unit includes a micro-fluidic unit circuit. The second unit includes a detection unit circuit. The detection unit circuit and micro-fluidic unit circuit are located in the drive array layer. The detection unit circuit at least includes an inorganic transistor and an organic transistor. The organic transistor at least includes an organic semiconductor part and is electrically connected to a sensitive electrode. The sensitive electrode is located at the second unit. A layer where the sensitive electrode is located is on a side of a layer where the inorganic transistor is located away from the first substrate. At the second unit, a side of the first base plate facing the second base plate includes a first hollow hole. The first hollow hole at least penetrates through the first hydrophobic layer and exposes the sensitive electrode.

Other aspects or embodiments of the present disclosure can be understood by those skilled in the art in light of the description, the claims, and the drawings of the present disclosure.

BRIEF DESCRIPTION OF THE DRAWINGS

The accompanying drawings, which are incorporated in and constitute a part of the specification, illustrate embodiments of the present disclosure and, together with the description, serve to explain the principles of the present disclosure. The drawings are merely examples for illustrative purposes according to various disclosed embodiments and are not intended to limit the scope of the present disclosure.

DETAILED DESCRIPTION

Figure 1:
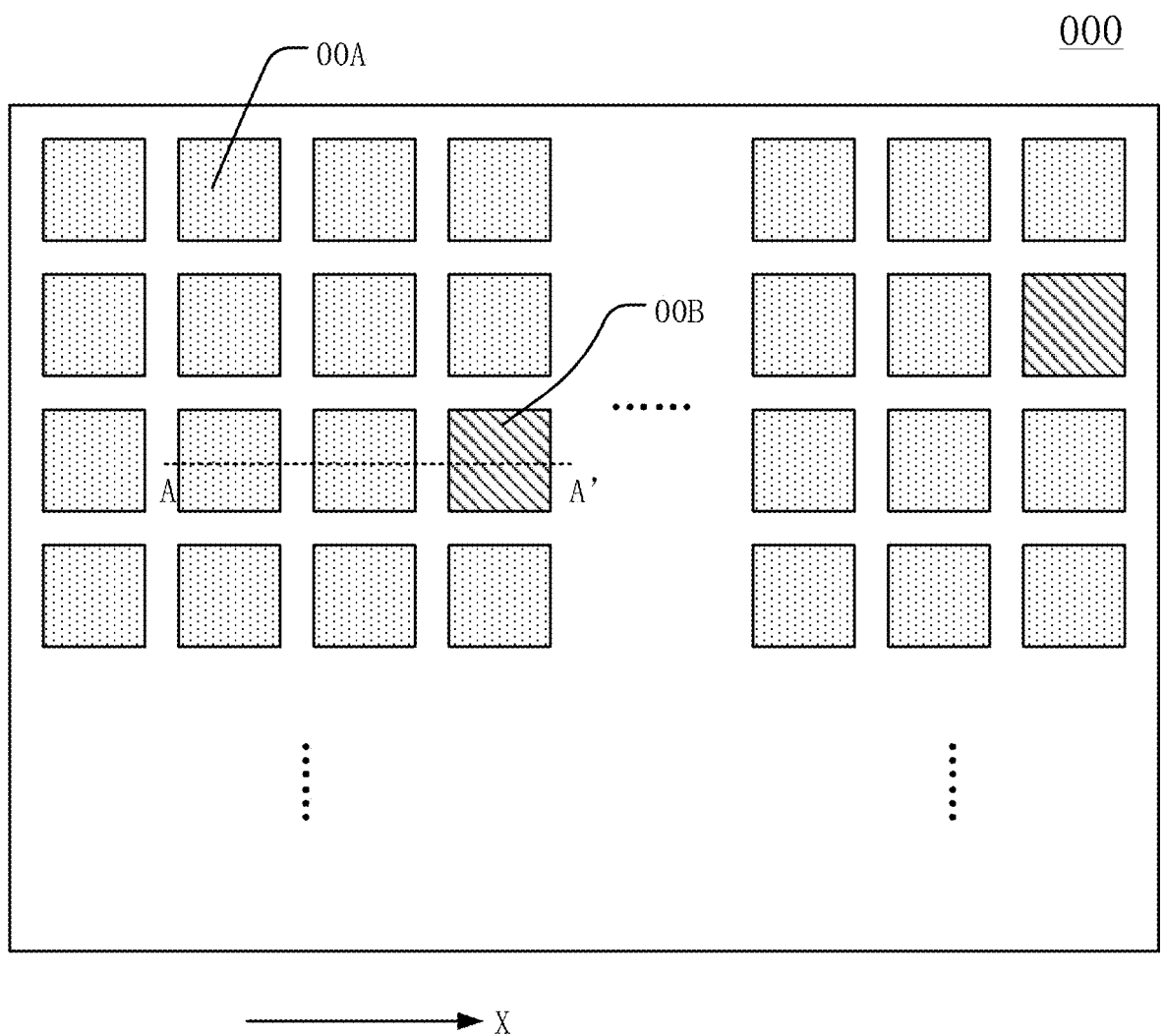
FIG. 1 shows a schematic diagram of a planar structure of a micro-fluidic detection device according to various disclosed embodiments of the present disclosure.

Reference will now be made in detail to exemplary embodiments of the disclosure, which are illustrated in the accompanying drawings. Unless otherwise specifically stated, the relative arrangement of components and steps, numerical expressions, and numerical values set forth in these embodiments do not limit the scope of the invention.

The following description for at least one exemplary embodiment is merely illustrative in nature and is in no way intended to limit the invention, its application, or uses.

Techniques, methods, and devices known to those of ordinary skill in the relevant art may not be discussed in detail, but where appropriate, such techniques, methods, and devices should be considered a part of the specification.

In all examples shown and discussed herein, any specific values are to be construed as illustrative only and not as limiting. Accordingly, other examples of the exemplary embodiments may have different values.

Structures and implementation methods provided by embodiments of the present disclosure may be combined with each other when there is no conflict or contradiction.

Any product implementing the present disclosure does not necessarily need to achieve all the disclosed technical effects at the same time.

It should be noted that similar reference numerals and letters indicate similar items in the following figures. Therefore, once an item is defined in one figure, it does not require further discussion in the following figures.

The present disclosure provides a micro-fluidic detection device to solve problems in the existing technology, such as some micro-fluidic reaction devices are unable to do testing, the detection sensitivity is limited, the detection equipment is costly, and operations are complex.

The present disclosure discloses a micro-fluidic detection device that includes a first base plate, a second base plate opposite to the first base plate, and a droplet travel layer located between the first and second base plates. The first base plate at least includes a first substrate, a drive array layer, a first electrode layer, and a first hydrophobic layer. The drive array layer is located on a side of the first substrate facing the second base plate. The first electrode layer is located on a side of the drive array layer facing the second base plate. The first hydrophobic layer is located on the side of the drive array layer facing the second base plate. The second base plate at least includes a second substrate, a second electrode layer, and a second hydrophobic layer. The second electrode layer is located on a side of the second substrate facing the first base plate. The second hydrophobic layer is located on a side of the second electrode layer facing the first base plate. The micro-fluidic detection device further includes multiple first units and multiple second units. The first electrode layer at least includes multiple drive electrodes. The drive electrodes are at the first units. The first unit includes a micro-fluidic unit circuit. The second unit includes a detection unit circuit. Both the detection unit circuit and the micro-fluidic unit circuit are located at the drive array layer. The detection unit circuit at least includes inorganic transistors and organic transistors. The organic transistor at least includes an organic semiconductor part. Organic transistors are electrically connected to sensitive electrodes, respectively. The sensitive electrode is located in the second unit. The layer where the sensitive electrode is disposed is located on a side of the layer where the inorganic transistor is located away from the first substrate. At the second unit, a side of the first base plate facing the second base plate includes a first hollow hole. The first hollow hole at least penetrates through the first hydrophobic layer. The first hollow hole exposes the sensitive electrode.

Compared with the existing technology, the micro-fluidic detection device provided by the present disclosure at least achieves the following beneficial effects:

The micro-fluidic detection device not only includes the first unit to realize the travel of droplets for reaction, mixing, sorting, and other operations, but also integrates the second unit for detection such as detection of concentration after the reaction, mixing, sorting, and other operations. The manufacturing process of the detection unit circuit including inorganic transistors may adopt mature inorganic transistor manufacturing technology in the panel field. The manufacturing process has low cost. It is easy to implement large-area array manufacturing. It reduces process difficulties such as connection with external systems and packaging. Further, the manufacturing process of inorganic transistors is compatible with the already mature process of transparent conductive electrodes. Materials of the transparent conductive electrode may be used as good sensitive electrode materials. The second units for biological detection may be integrated in a device with a micro-fluidic structure. Further, the process is less difficult, which is beneficial to improving process efficiency. The first hollow hole at least penetrates the first hydrophobic layer at the position of the second unit. The first hollow hole exposes the sensitive electrode. There is no material of the hydrophobic layer at the position of the second unit. The hydrophilicity is high at the position of the second unit. When reacting and detecting are performed on trace samples, and reacted solution samples to be detected are transferred from a first unit to an adjacent second unit, the transfer may be achieved only through the difference in the interface hydrophilicity and hydrophobicity. There is no need to control the surface hydrophilicity and hydrophobicity through the potential of the electrode. The second unit may be directly used as a detection point without consuming additional space resources on the first base plate. The first unit includes the micro-fluidic unit circuit. The second unit includes the detection unit circuit. When the first and second units are integrated at the micro-fluidic detection substrate (or base plate), fixed-point, timed, quantitative biological reactions and accurate detection may be achieved. It is helpful to greatly reduce the demand for samples and save costs. Further, the detection sensitivity may be improved through the detection unit circuit that includes organic transistors. It is beneficial to shorten the detection time and improve the detection efficiency and detection accuracy. The detection unit circuit contains heterogeneously integrated organic transistors and inorganic transistors. Layer structures of the organic transistors may be made on top of layer structures of the inorganic transistors with mature processes. It reduces the process difficulty and improves process efficiency.

Figure 2:
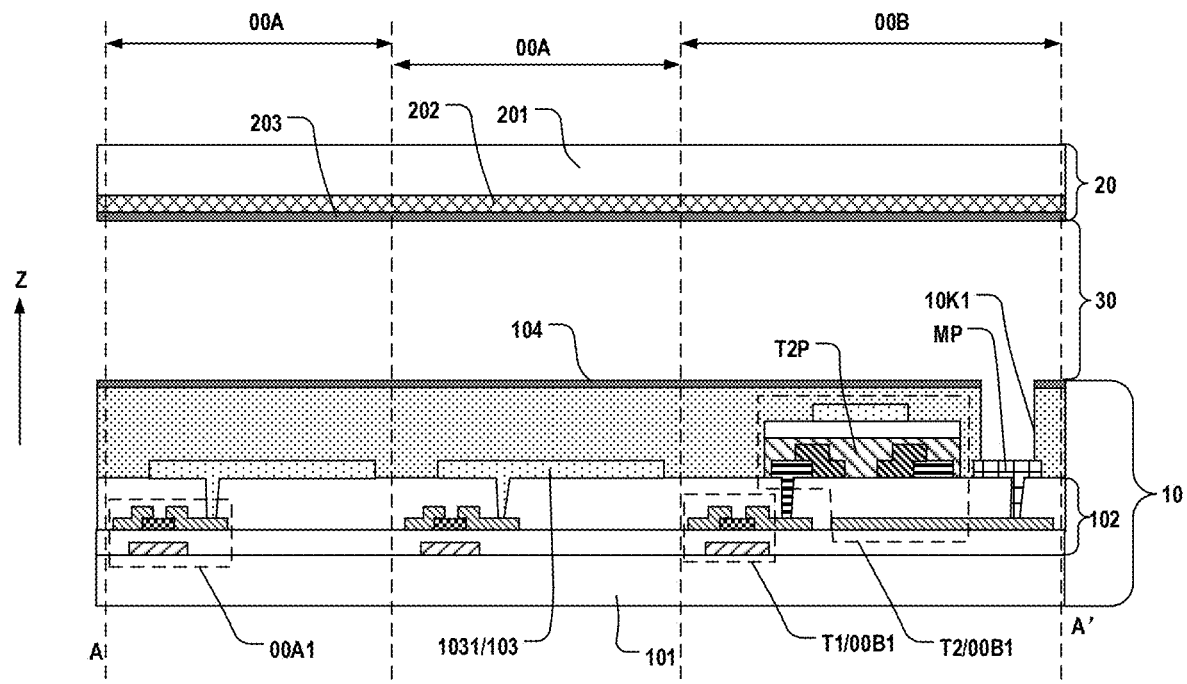
FIG. 2 shows a schematic cross-sectional structural diagram along an A-A' direction in FIG. 1 according to various disclosed embodiments of the present disclosure.

FIG. 1 illustrates a schematic diagram of a planar structure of a micro-fluidic detection device 000 according to the present disclosure. FIG. 2 illustrates a schematic cross-sectional structural diagram along an A-A' direction in FIG. 1 according to the present disclosure. The micro-fluidic detection device 000 includes a first base plate 10, a second base plate 20 opposite to the first base plate 10, and a droplet travel layer 30 located between the first and second base plates. The term "droplet" as used herein indicates a liquid droplet.

The first base plate 10 at least includes a first substrate 101, a drive array layer 102, a first electrode layer 103, and a first hydrophobic layer 104. The drive array layer 102 is located on a side of the first substrate 101 facing the second base plate 20. The first electrode layer 103 is located on a side of the drive array layer 102 facing the second base plate 20. The first hydrophobic layer 104 is located on the side of the drive array layer 102 facing the second base plate 20.

The second base plate 20 at least includes a second substrate 201, a second electrode layer 202, and a second hydrophobic layer 203. The second electrode layer 202 is located on a side of the second substrate 201 facing the first base plate 10. The second hydrophobic layer 203 is located on the side of the second electrode layer 202 facing the first base plate 10.

The micro-fluidic detection device 000 further includes multiple first units 00A and multiple second units 00B. As shown in FIG. 1, the first unit 00A and second unit 00B are distinguished by different filling patterns. The first electrode layer 103 at least includes multiple drive electrodes 1031. The drive electrodes 1031 are at the first units 00A.

The first unit 00A includes a micro-fluidic unit circuit 00A1. The second unit GOB includes a detection unit circuit 00B1. Both the detection unit circuit 00B1 and the micro-fluidic unit circuit 00A1 are located in the drive array layer 102.

The detection unit circuit 00B1 at least includes inorganic transistors T1 and organic transistors T2. The organic transistors T2 at least include an organic semiconductor part T2P. The organic transistors T2 are electrically connected to sensitive electrodes MP. The sensitive electrodes MP are located at the second units GOB. The layer where the sensitive electrode MP is disposed is located on the side of a layer where the inorganic transistors T1 are located away from the first substrate 101.

At the second unit GOB, a side of the first base plate 10 facing the second base plate 20 includes a first hollow hole 10K1. The first hollow hole 10K1 at least penetrates through the first hydrophobic layer 104. The first hollow hole 10K1 exposes the sensitive electrode MP.

In some embodiments, the micro-fluidic detection device 000 may be used for reactions and detection of trace samples (i.e., samples with a trace amount). The micro-fluidic detection device 000 includes the first units 00A and second units 00B. Optionally, the first units 00A may be arranged in an array, or in some other ways, which are not limited in the embodiments. As shown in FIG. 1, the first units 00A are configured in an array arrangement exemplarily. The first unit 00A includes the micro-fluidic unit circuit 00A1. The micro-fluidic unit circuit 00A1 may be used to provide drive signals for driving trace samples to perform operations such as droplet travel, mixing, etc. As such, reaction functions such as splitting, merging, mixing, and sorting of droplets and other samples are performed at the micro-fluidic detection device 000. As mentioned above, the micro-fluidic detection device 000 includes second units GOB. Optionally and exemplarily, the number of the second units GOB included in the micro-fluidic detection device 000 is smaller than the number of the first units 00A in some cases. The second unit GOB may be disposed at a position in the micro-fluidic detection device 000 where the splitting, merging, mixing, and sorting of samples such as droplets have been completed. For example, the second unit GOB may be arranged at a position between the first units 00A or another selected position at the device 000. The second unit GOB includes the detection unit circuit 00B1. The detection unit circuit 00B1 is used to detect the concentration and other data of droplets to be detected after splitting, merging, mixing, sorting, and other functions of the droplets have been completed.

As aforementioned, the first and second units 00A and GOB include the micro-fluidic unit circuit 00A1 and detection unit circuit 00B1, respectively. The micro-fluidic detection device 000 may perform operations such as traveling, mixing, and sorting of trace samples at the first unit 00A, while performing detection at the second unit GOB, such as concentration measurements of droplets to be detected after mixing or sorting is completed. It is equivalent to integrating functions of biological reaction and detection at one device. It saves detection time and cost. Through the position arrangement of the first and second units 00A and 00B, fixed-point, timed, and quantitative biological reactions and detection may be realized. The detection time may be further reduced by integrating reaction and detection functions at one device. Since the sample amount required for reaction and the sample amount required for detection are both determined by the micro-fluidic detection device, it is beneficial for reducing the demand for samples.

Complementary metal oxide semiconductor (CMOS) integrated circuit technology has been used to develop various microarray chips. The reaction and detection functions are integrated. In the field of rapid detection, the detection of biomolecules (nucleic acids) is mainly based on timed fluorescence quantitative polymerase chain reaction or rolling circle amplification technology. The detection principle mainly includes using sensitive electrodes to detect a proportional number of hydrogen ions shed during the nucleic acid amplification process, or directly using specific complementary nucleic acid fragments to capture target nucleic acid fragments to achieve quantification. This electrochemical method can integrate the reagent reaction process and electrical detection functions to make integrated reaction and detection chips. However, this technology belongs to the category of biological experimental methods, and the detection sensitivity is low. If the initial content of target nucleic acid fragments in a sample is too small, it cannot be detected. It is difficult to achieve accurate quantitative detection of multiple indicators. Moreover, the integration cost per unit area of CMOS technology is high. The chip is highly integrated and small in size. Integration with external systems requires high-precision leads, which brings high costs to the packaging process. Conventional CMOS processes are difficult to provide interface materials that can modify biological probe molecules. Thus, it is necessary to superimpose a high-precision post-processing process on the basis of CMOS and integrate reference electrodes, which has high process difficulties. Reaction and detection integrated chips based on CMOS integrated circuit technology have some issues. For example, detection sensitivity cannot be effectively guaranteed and it may cause a large demand for testing samples. Further, the equipment is expensive, bulky, and complex to operate.

In order to solve the above problems, some areas in a micro-fluidic chip structure may be used as detection pixels. The micro-fluidic detection device 000 provides integrated functions for reaction and detection. As aforementioned, the layer structure of the micro-fluidic detection device 000 includes the first base plate 10, the second base plate 20 opposite to the first base plate 10, and the droplet travel layer 30 located between the first and second base plates. In some embodiments, the droplet travel layer 30 may be a silicone oil layer for droplets to flow. The droplet travel layer 30 may also be an air layer for droplets to travel in some other cases. Further, the droplet travel layer 30 may contain other materials for droplets to travel, and the other materials only need to be able to make sample droplets travel to a desired position in the droplet travel layer. The first and second base plates 10 and 20 are arranged oppositely. The first base plate 10 at least includes the first substrate 101, the drive array layer 102, the first electrode layer 103, and the first hydrophobic layer 104 that are stacked. Optionally, the first substrate 101 may be a glass substrate used as a carrier substrate. The drive array layer 102 may be used to set up drive circuits and detection circuits, which are used to drive droplets to move and detect droplets after the droplets complete reactions, respectively. For example, the micro-fluidic unit circuit 00A1 and the detection unit circuit 00B1 may both be disposed in the drive array layer 102. In some embodiments, the drive array layer 102 may include conductive layers and insulating layers to arrange the setting of electrical connection structures such as transistors or capacitors in unit circuits. The first electrode layer 103 may be used to provide an electrode structure that drives droplets to travel. For example, the drive electrode 1031 in the first unit 00A may be configured using the first electrode layer 103. Optionally, one drive electrode 1031 may correspond to one first unit 00A. The second electrode layer 202 in the opposite second base plate 20 may be used as a common electrode layer. The second electrode layer 202 is connected to a fixed common potential signal. The fixed common potential signal is used to form an electric field between the second electrode layer 202 and the drive electrode 1031 of the first electrode layer 103. The electric field drives droplets to travel and move in the droplet travel layer 30. The second substrate 201 in the second base plate 20 may also be a glass substrate and used as a carrier substrate. The first hydrophobic layer 104 is located on a side of the first base plate 10 facing the second base plate 20. The second hydrophobic layer 203 is located on a side of the second base plate 20 facing the first base plate 10. Both the first and second hydrophobic layers 104 and 203 play a hydrophobic role. They prevent droplets from staying at a certain position for a long time and facilitate the effective travel of droplets and other samples in the droplet travel layer 30.

In some embodiments, the second electrode layer 202 may also be fabricated on the first base plate 10. That is, a side of the first base plate 10 facing the second base plate 20 may include both the first and second electrode layers 103 and 202. Electrode structures that drive droplets to travel are all arranged on the first base plate 10. As such, no electrode layer is provided on the second base plate 20. The second base plate 20 may work as a sealing cover with a hydrophobic layer. It simplifies the structure of the second base plate 20. In figures of the embodiments, the second electrode layer 202 is located on the second base plate 20 exemplarily.

The micro-fluidic detection device 000 includes the first and second units 00A and 00B that are integrated together. The first unit 00A is arranged for reaction, mixing, sorting, and other operations of droplets. The second unit 00B is used for concentration measurement and other detections of droplets after the reaction, mixing, sorting, and other operations. The second unit 00B includes the detection unit circuit 00B1. The detection unit circuit 00B1 and micro-fluidic unit circuit 00A1 are both disposed in the drive array layer 102. The detection unit circuit 00B1 at least includes the inorganic transistor T1 and organic transistor T2. The organic transistor T2 includes at least an organic semiconductor part T2P. The organic transistor T2 is electrically connected to the sensitive electrode MP. The sensitive electrode MP is located in the second unit GOB. The layer where the sensitive electrode MP is located is on a side of the layer where the inorganic transistor T1 is located away from the first substrate 101. The sensitive electrode MP is used as a detection electrode for reaction solutions. The detection unit circuit 00B1 contains the inorganic transistor T1 and organic transistor T2. Due to its small leakage, the inorganic transistor T1 may be used as a switch for the initial detection of the detection unit circuit 00B1. The organic transistor T2 has a large sub-threshold swing, and is suitable for use as a sensing element for biomolecules. In some cases, the basic structure and function of the organic transistor T2 are basically the same as those of traditional inorganic thin film transistors, except that organic semiconductors are used as working substances in the organic transistor process. Semiconductor materials of the inorganic transistor T1 are generally inorganic silicon. The organic transistor T2 uses organic semiconductor materials. Compared to the existing amorphous silicon or polycrystalline silicon inorganic transistors, the organic transistor T2 has characteristics of low process temperature (generally below 120 degrees Celsius) and low cost. The organic transistor T2 of the detection unit circuit 00B1 is electrically connected to the sensitive electrode MP. The sensitive electrode MP may be a biomolecule or ion sensitive electrode. Ions in solutions to be detected are relatively easy to adsorb to the surface of the sensitive electrode MP, thereby changing the potential of the sensitive electrode MP. The organic transistor T2 is electrically connected to the sensitive electrode MP, which is used in the detection unit circuit 00B1 to detect biomolecules at the position of the second unit 00B.

As aforementioned, the detection unit circuit 00B1 includes the inorganic transistors T1. The manufacturing process of the detection unit circuit 00B1 may adopt mature inorganic transistor manufacturing technologies in the panel field. The production cost per unit area is lower than that of CMOS integration technology. It is relatively easy to realize large-area array preparation and reduce difficulties in processes such as connection with external systems and packaging. Moreover, the manufacturing process of inorganic transistors is compatible with that of the transparent conductive electrodes. Materials of the already mature transparent conductive electrodes are good sensitive electrode materials. The second unit 00B for biological detection may be integrated in a device with a micro-fluidic structure. The process is less difficult, which is conducive to improving process efficiency. At the position of the second unit GOB, a side of the first base plate 10 facing the second base plate 20 includes the first hollow hole 10K1. Along a direction Z perpendicular to the plane of the first substrate 101, the first hollow hole 10K1 at least penetrates the first hydrophobic layer 104. The sensitive electrode MP is exposed through the opening of the first hollow hole 10K1. It is conducive to full contact between the sensitive electrode MP and solutions to be detected to ensure the detection effect.

When reactions and detection of trace samples are performed at the micro-fluidic detection device 000, one or more solutions to be reacted may be added in a small or trace amount through one or more injection ports. The solution travels in the droplet travel layer 30 and goes through reaction operations such as mixing and sorting. By controlling the voltage at the drive electrode 1031 of each first unit 00A, the drive electric field intensity between the drive electrodes 1031 of the first units 00A and the second electrode layer 202 is made different for each first unit 00A. Droplets to be reacted travel in the droplet travel layer 30 to complete reaction operations such as mixing and sorting, e.g., a trace amount of droplets being controlled to travel in a certain direction (if there are other types of reaction solutions, they may enter from another injection port and then travel in the same direction), and finally merge at a position of a certain first unit 00A to fully react. Thereafter, the voltage at the drive electrode 1031 is used to move the droplets to a certain second unit 00B position (e.g., a detection point position). The first hollow hole 10K1 at least penetrates the first hydrophobic layer 104 at the position of the second unit 00B. The first hollow hole 10K1 exposes the sensitive electrode MP. There is no hydrophobic layer material at the position of the second unit 00B. The hydrophilicity is high at the position of the second unit 00B. As such, when reacted solution samples to be detected are transferred from a first unit 00A to an adjacent second unit 00B, the transfer may be made only through the difference in interface hydrophilicity and hydrophobicity. There is no need to control the surface hydrophilicity and hydrophobicity through the potential of the electrode. Therefore, the second unit GOB may be directly used as a detection point. No additional space resources on the substrate are consumed. A subsequently reacted solution to be detected directly enters the first hollow hole 10K1 and contacts the sensitive electrode MP to complete the concentration detection of the solution. It may not only achieve fixed-point, timed, and quantitative biological reactions and detection, but also greatly reduce the demand for samples. Since a trace amount of sample may complete the required reaction and detection, it may also speed up the reaction speed. It is helpful to speed up the concentration change of a substance to be measured in a sample and further shorten the detection time.

The reacted solution to be detected does not need to be transferred to other locations after entering the first hollow hole 10K1. Thus, there is no need to set the first unit 00A including the micro-fluidic unit circuit 00A1 at a detection point to arrange the movement function of micro-fluidics. The detection point position may be directly used as the second unit 00B. Detection functions are arranged through heterogeneous integration at the structure of micro-fluidic devices. During a manufacturing process, after making the micro-fluidic unit circuit 00A1 of the first unit 00A, the micro-fluidic array substrate (or base plate) may be directly etched out to form the second unit GOB. Moreover, the inorganic transistor T1 at the second unit GOB may be made by reusing the array base plate of the existing micro-fluidic technology. For example, the layer structure of the organic transistor T2 in the second unit GOB may be directly fabricated at the position of the organic transistor T2 on the micro-fluidic array base plate. It may reduce the difficulty of production and save production costs.

As aforementioned, the first unit 00A includes the micro-fluidic unit circuit 00A1 and the second unit GOB includes the detection unit circuit 00B1. Since the first and second units 00A and GOB are integrated at the micro-fluidic detection device 000, fixed-point, timed, and quantitative biological reactions and accurate detection may be performed. It may reduce the demand for samples and save costs. The detection sensitivity may be improved by the detection unit circuit 00B1 that includes organic transistors T2. It may shorten the detection time and improve the detection efficiency and accuracy. The detection unit circuit 00B1 contains heterogeneously integrated organic and inorganic transistors. Layer structures of the organic transistors may be made on top of layer structures of the inorganic transistors with mature processes. It may reduce process difficulties and improve process efficiency.

The micro-fluidic unit circuit 00A1 may have various electrical connection structures. Each first unit 00A may include inorganic transistors (only one inorganic transistor is shown exemplarily in FIG. 2). The inorganic transistor may be arranged in the drive array layer 102. That is, the process technology may be the same as that used for making part of the layers of the detection unit circuit 00B1. Certain mature drive circuits of micro-fluidic technologies may be utilized. The number of inorganic transistors T1 provided in the detection unit circuit 00B1 at each second unit GOB is not specifically limited. In some cases, the inorganic transistor T1 may be used as a switch and the number of the inorganic transistors T1 may be determined according to the number of structures that are controlled by the inorganic transistors T1. Optionally, the inorganic transistor T1 may also be used as a transistor to implement other functions at the second unit GOB, such as an amplification transistor. The embodiments do not have any limit for use of the transistors, as long as the second unit GOB includes an inorganic transistor T1 and an organic transistor T2.

The micro-fluidic detection device 000 includes but is not limited to the above structures. In some embodiments, the micro-fluidic detection device 000 may include other structures, such as signal traces for providing drive signals to each first unit 00A and each second unit GOB. The micro-fluidic detection device 000 may also include control and signal transmission circuit systems that provide drive signals, read detection signals, etc. for the micro-fluidic unit circuits 00A1 and detection unit circuits 00B1.

Figure 3:
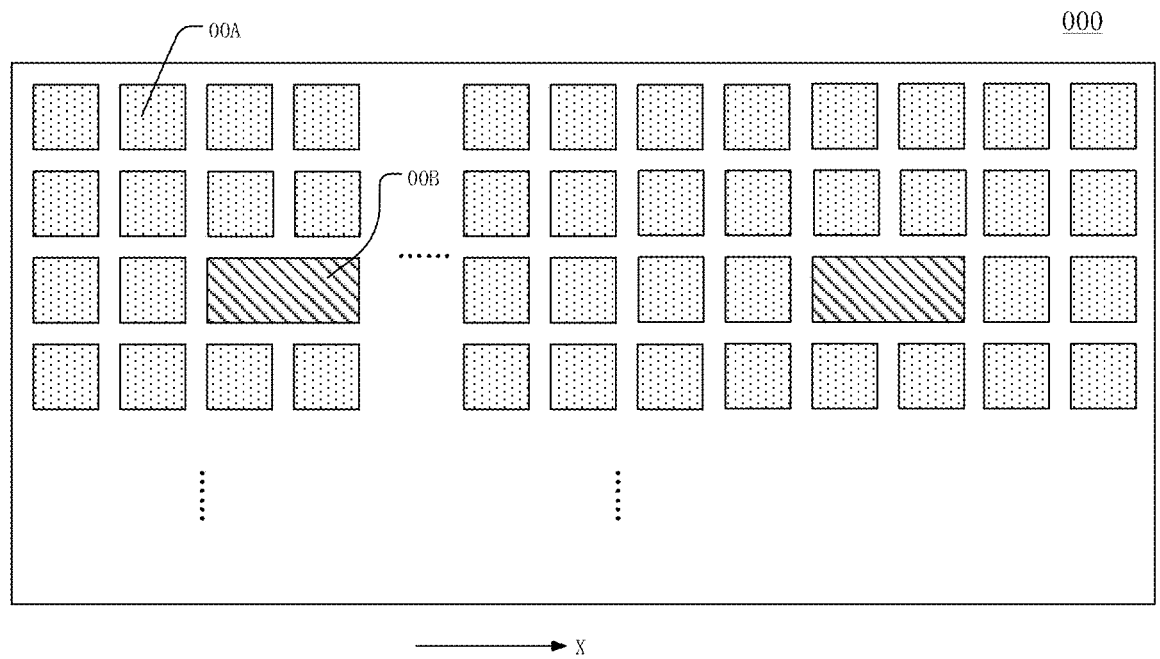
FIG. 3 shows a schematic diagram of another planar structure of the micro-fluidic detection device according to various disclosed embodiments of the present disclosure.
Figure 4:
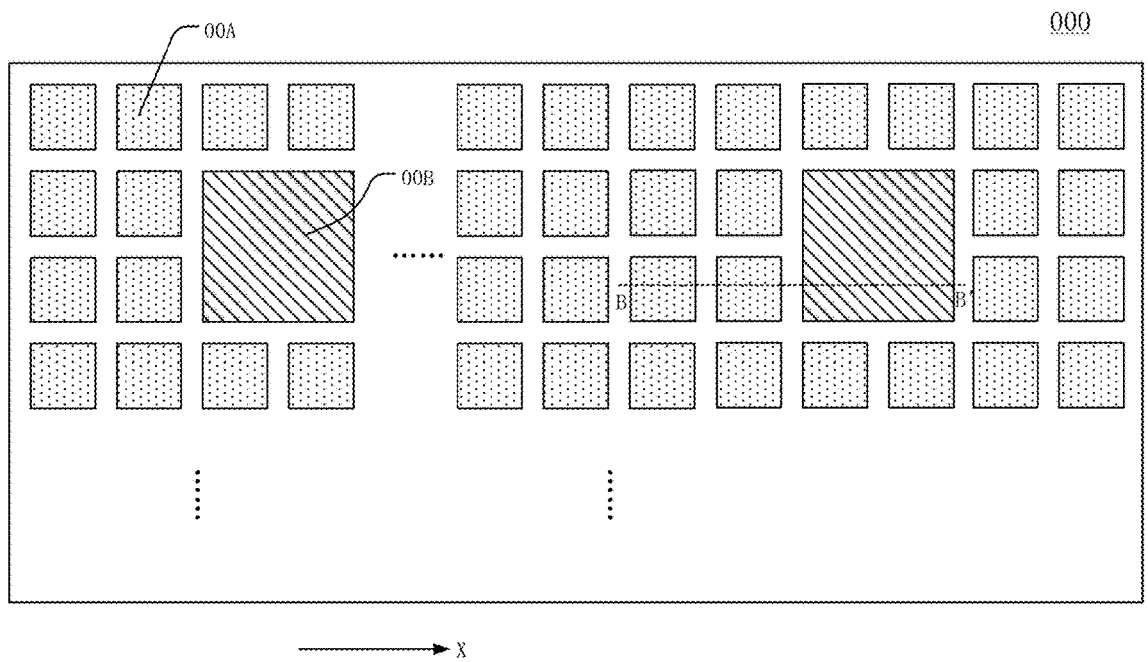
FIG. 4 shows a schematic diagram of another planar structure of the micro-fluidic detection device according to various disclosed embodiments of the present disclosure.

FIGS. 3 and 4 illustrate schematic diagrams of other planar structures of the micro-fluidic detection device 000 according to the present disclosure. In some embodiments, the orthographic projection area of the second unit 00B on a plane where the first substrate 101 is located is greater than that of the first unit 00A on the plane.

The first and second units 00A and 00B are integrated at the micro-fluidic detection device 000. In some cases, the second unit 00B occupies a larger space than the first unit 00A. For example, the orthographic projection area of the second unit 00B on the plane where the first substrate 101 is located is greater than that of the first unit 00A on that plane. The sensitive electrode MP is electrically connected to the organic transistor T2 in the detection unit circuit 00B1. A surface of the sensitive electrode MP that contacts samples to be tested needs to be modified to a certain extent (e.g., modified by specific biological probes). The sensitive electrode MP has binding sites for ions to be detected such as hydrogen ions, and may converting the hydrogen ion concentration of a sample to be detected into a voltage. Thus, the sensitive electrode MP requires a certain contact area with a sample to be detected to detect the ion concentration. The specific structure of the sensitive electrode MP needs to occupy a certain area. Compared to the first unit 00A, the orthographic projection area of the second unit 00B on the plane where the first substrate 101 is located is larger. For example, the orthographic projection area of one second unit 00B is made at least larger than that of one first unit A. In some embodiments, the area of the sensitive electrode MP electrically connected to the organic transistor T2 in the second unit 00B may be as large as possible. It is beneficial to ensure that a contact area between the sensitive electrode MP and a sample to be detected is large enough when the detection unit circuit 00B1 is used to detect the ion concentration in the sample. Further, it improves the detection sensitivity.

In some cases, the orthographic projection area of one second unit 00B on a plane where the first substrate 101 is located is equivalent to the orthographic projection area of two first units 00A on the plane (as shown in FIG. 3) or more than two first units 00A on the plane (as illustrated in FIG. 4). In such cases, the orthographic projection area of one second unit 00B on the plane may be at least larger than that of one first unit 00A on the plane.

Figure 5:
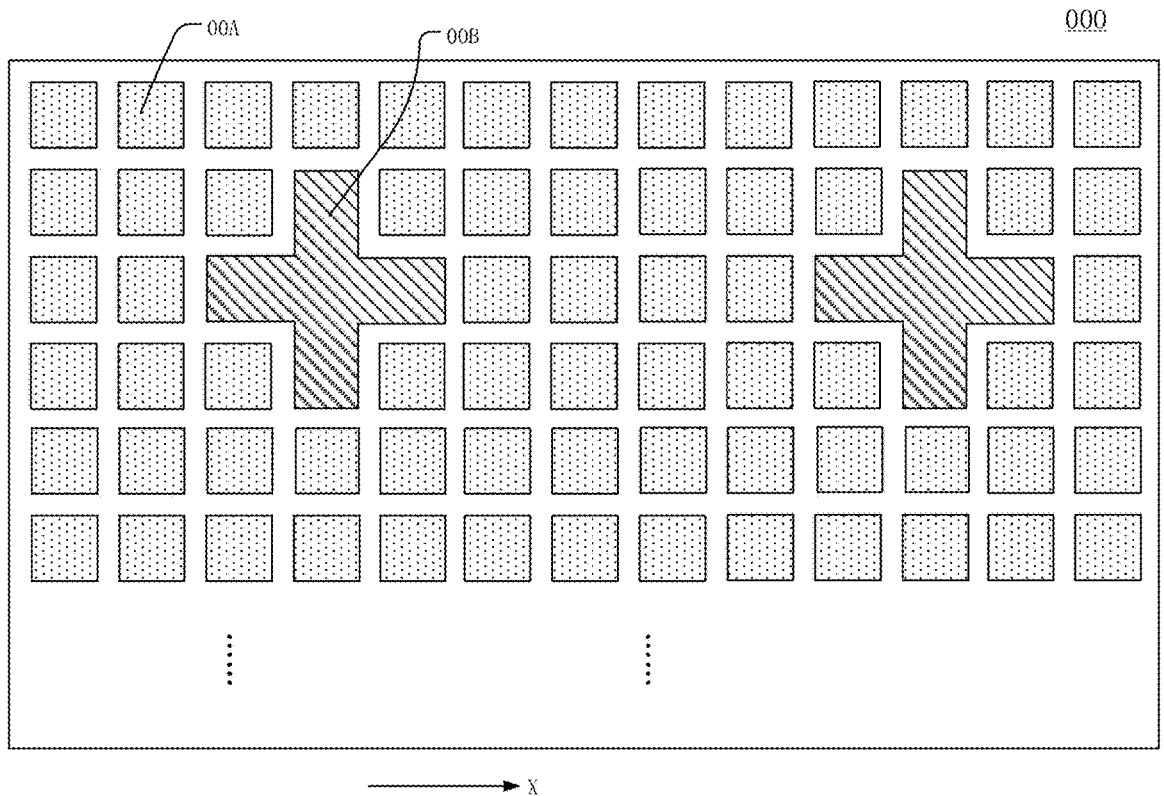
FIG. 5 shows a schematic diagram of another planar structure of the micro-fluidic detection device according to various disclosed embodiments of the present disclosure.

In FIGS. 1, 3, and 4, the shape of the orthographic projection of the second unit 00B on a plane where the first substrate 101 is located is a regular shape such as a square or rectangle exemplarily. In some other embodiments, the shape of the orthographic projection of the second unit 00B on the plane may be an irregular shape, as shown exemplarily in FIG. 5. FIG. 5 illustrates a schematic diagram of another planar structure of the micro-fluidic detection device 000 according to the present disclosure. The orthographic projection of the second unit 00B on the plane of the first substrate 101 has an irregular shape. The first and second units 00A and 00B are integrated in the micro-fluidic detection device 000 and include micro-fluidic unit circuit 00A1 and detection unit circuit 00B1, respectively. As mentioned above, the orthographic projection area of one second unit GOB on a plane where the first substrate 101 is located may be at least larger than that of one first unit 00A on the plane.

In some embodiments, the orthographic projection area of the second unit GOB on the plane where the first substrate 101 is located and the orthographic projection area of the first unit 00A on the plane where the first substrate 101 is located may be in a multiple relationship. Therefore, during a manufacturing process, after layer structures of the micro-fluidic base plate with a mature process technology is completed, it is convenient to etch out multiple layers at a position where the first unit 00A is originally located to continue to make layers of organic transistors. A second unit GOB including the detection unit circuit 00B1 is formed within a range where a first unit 00A is originally arranged.

It may avoid affecting an occupied space of the first unit 00A in the micro-fluidic detection device, thereby ensuring the travel control of samples to be detected by the first unit 00A.

Referring to FIGS. 1 and 3-5, in some embodiments, along the X direction parallel to a plane of the first substrate 101, there are at least three first units 00A between two adjacent second units 00B.

As aforementioned, the first unit 00A and second units 00B are integrated at the micro-fluidic detection device 000. At least three first units 00A may be arranged between two adjacent second units 00B in the X direction. It avoids that the distance between two adjacent second units 00B is too short, which may cause test samples to be easily mixed and affect test results. It may ensure that there is enough spare space between two adjacent second units 00B, which is helpful to avoid mixing problems between test samples. Further, it helps ensure the accuracy of detection results.

In some embodiments, along the X direction, the number of the first units 00A disposed between two adjacent second units 00B does not need to be too large. It may avoid the problem of reduction of detection numbers. When two adjacent second units 00B are too far away from each other, samples processed simultaneously in the micro-fluidic detection device 000 may be decreased. It helps improve the utilization rate of the detection device.

Figure 6:
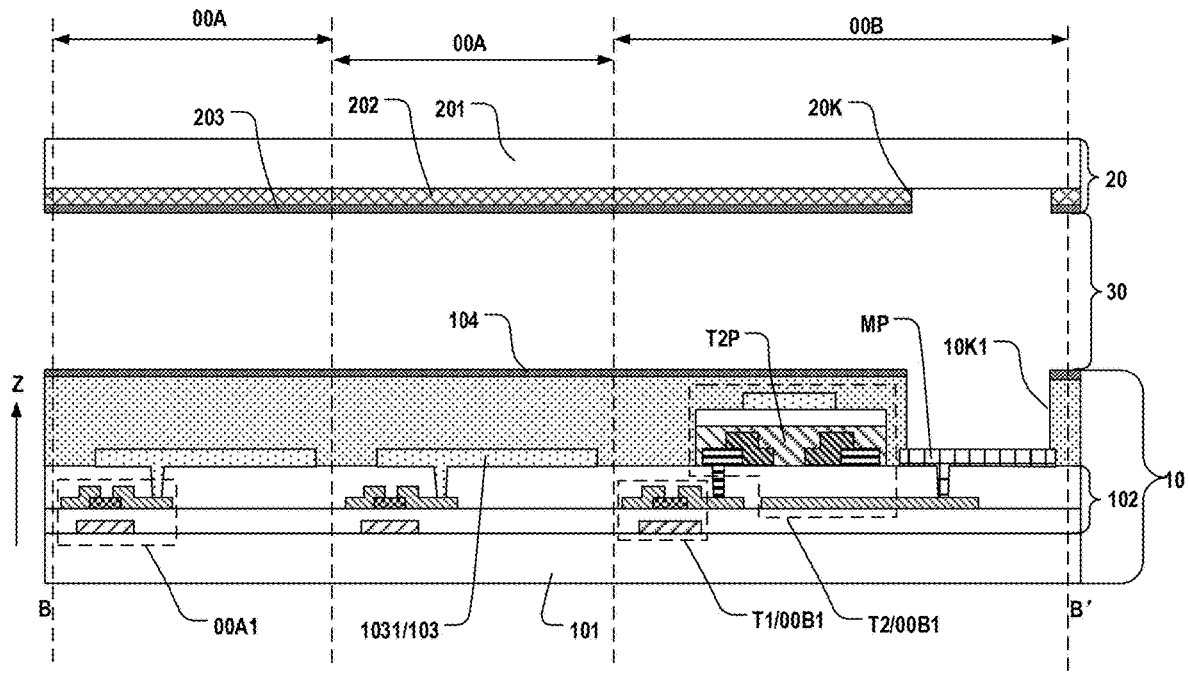
FIG. 6 shows a schematic cross-sectional structural diagram along a B-B' direction in FIG. 4 according to various disclosed embodiments of the present disclosure.

FIG. 6 illustrates a schematic cross-sectional structural diagram along a B-B' direction in FIG. 4 according to the present disclosure. Referring to FIGS. 4 and 6, at the second unit 00B, the side of the second base plate 20 facing the first base plate 10 includes a second hollow hole 20K, and the second hollow hole 20K at least penetrates the second hydrophobic layer 203 and the second electrode layer 202.

As aforementioned, the second unit 00B at the micro-fluidic detection device 000 contains the detection unit circuit 00B1. In some embodiments, at the position of the second unit 00B, the second hollow hole 20K may be configured on the side of the second base plate 20 facing the first base plate 10. Along the Z direction that is perpendicular to the plane of the first substrate 101, the second hollow hole 20K at least penetrates through the second hydrophobic layer 203 and second electrode layer 202. Optionally, the position of the second hollow hole 20K corresponds to the position of the first hollow hole 10K1. It allows samples to be detected to smoothly flow onto the exposed sensitive electrode MP at the first hollow hole 10K1 and fully contact the sensitive electrode MP.

In some embodiments, the size and shape of the second hollow hole 20K may match that of the first hollow hole 10K1. It may help improve the uniformity of the formation of droplet samples to be detected at the sensitive electrode MP, thereby improving the accuracy of the detection result.

Figure 7:
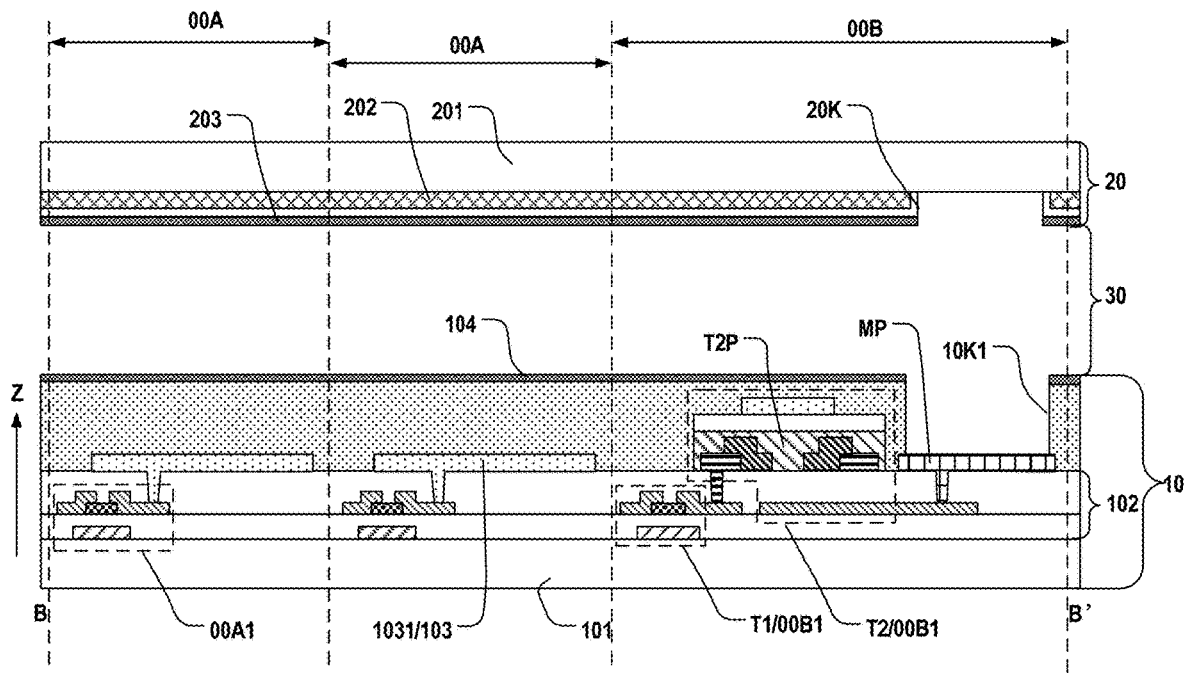
FIG. 7 shows another schematic cross-sectional structural diagram along the B-B' direction in FIG. 4 according to various disclosed embodiments of the present disclosure.

FIG. 7 illustrates another schematic cross-sectional structural diagram along the B-B' direction in FIG. 4 according to the present disclosure. Referring to FIGS. 4 and 7, when the second hollow hole 20K is provided on the side of the second base plate 20 facing the first base plate 10, the second hydrophobic layer 203 or an insulating layer between the second hydrophobic layer 203 and second electrode layer 202 may cover the side edge of the second electrode layer 202 at the position of the second hollow hole 20K. The side edge (or sidewall) of the second electrode layer 202 may be covered completely in some cases. Alternatively, the side edge (or sidewall) of the second electrode layer 202 may be covered partially in some other cases. It protects the second electrode layer 202 and prevents the conductive performance of the second electrode layer 202 from being affected.

Figure 8:
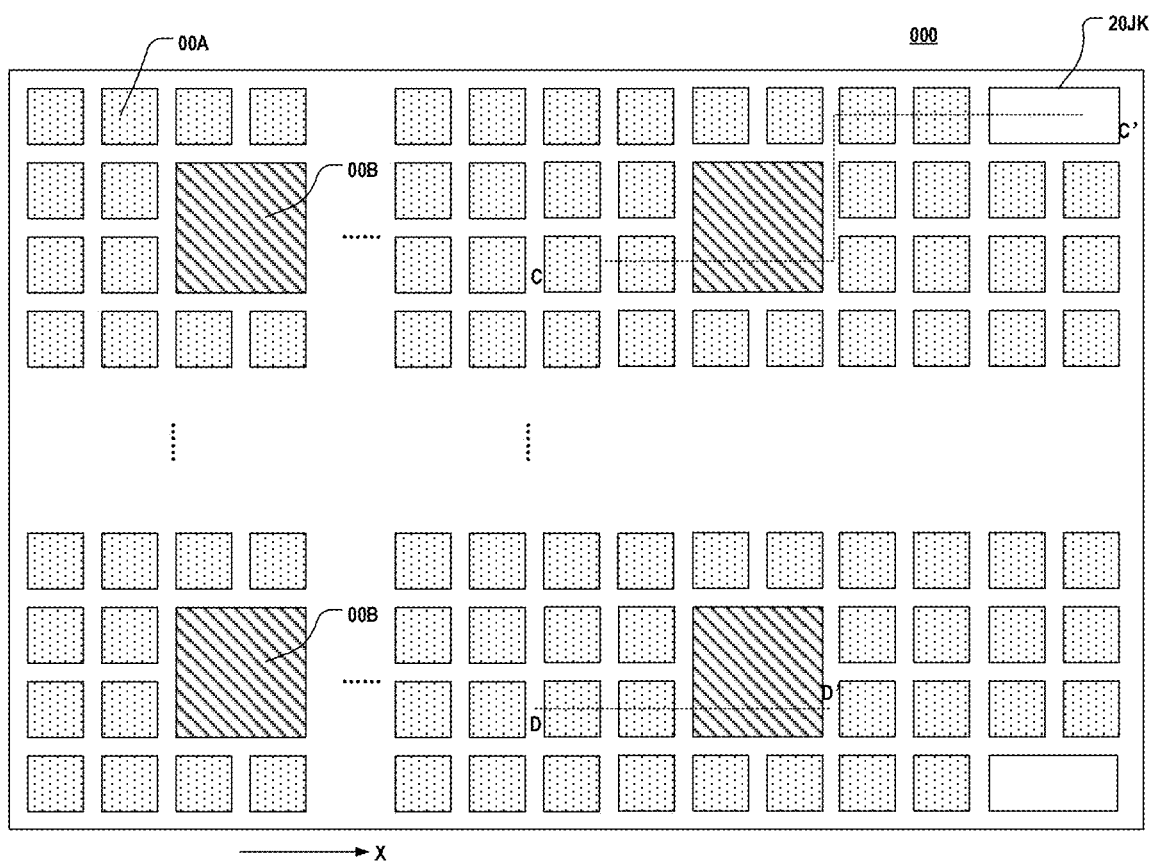
FIG. 8 shows a schematic diagram of another planar structure of the micro-fluidic detection device according to various disclosed embodiments of the present disclosure.
Figure 9:
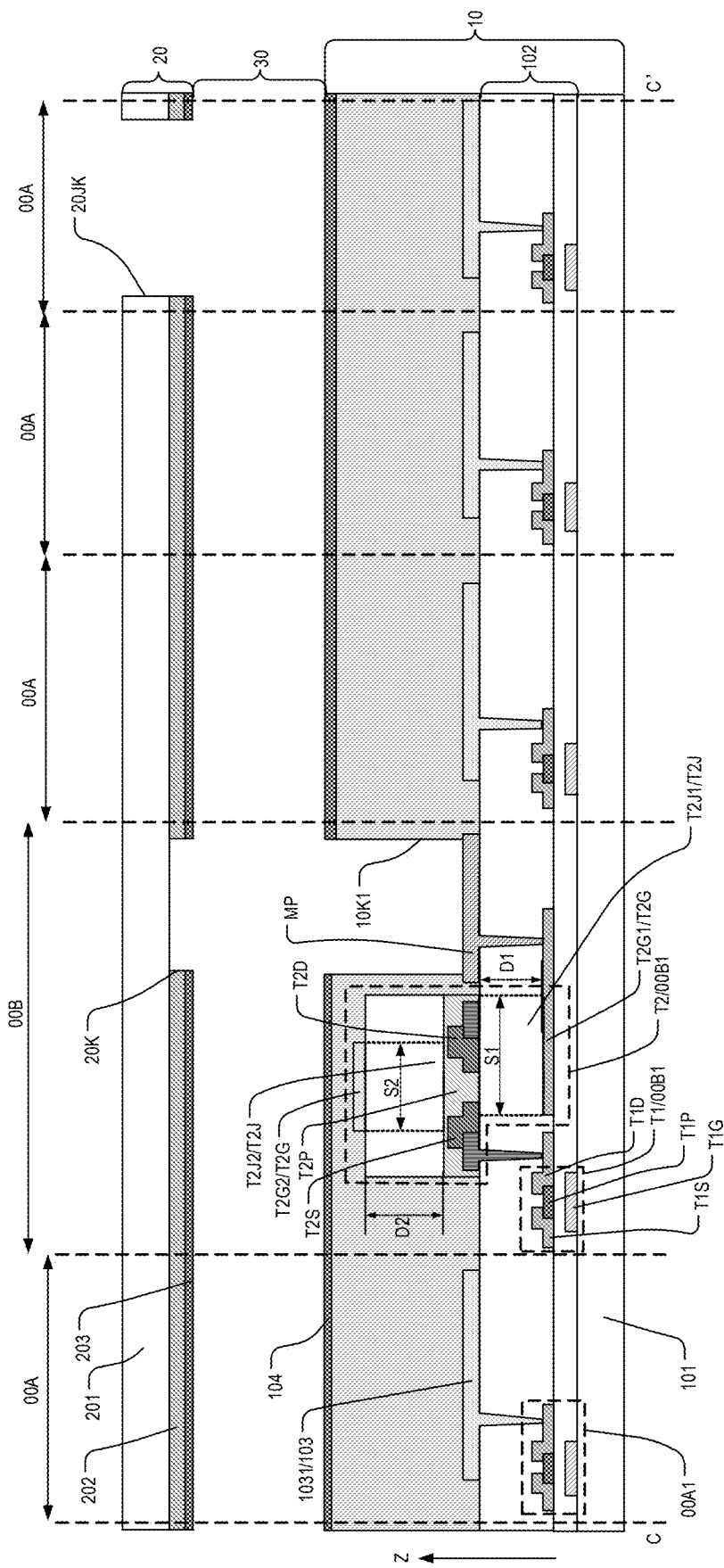
FIG. 9 shows a schematic cross-sectional structural diagram along a C-C' direction in FIG. 8 according to various disclosed embodiments of the present disclosure.

FIG. 8 illustrates a schematic diagram of another planar structure of the micro-fluidic detection device 000 according to the present disclosure. FIG. 9 illustrates a schematic cross-sectional structural diagram along a C-C' direction in FIG. 8 according to the present disclosure. In some embodiments, the second base plate 20 at least includes an injection hole 20JK. The injection hole 20JK at least penetrates the second substrate 201, the second electrode layer 202, and the second hydrophobic layer 203. The second electrode layer 202 (or a body of the second electrode layer 202) except the second hollow hole 20K and injection hole 20JK forms an integrated connection structure.

The droplet travel layer 30 is between the first and second base plates 10 and 20 at the micro-fluidic detection device 000. In order to transfer samples to be reacted and detected to the droplet travel layer 30, the injection hole 20JK may be arranged on a side of the second base plate 20 where less layer structure is arranged. As such, it avoids affecting layer structures of the micro-fluidic unit circuit 00A1 and the detection unit circuit 00B1 disposed on a side of the first base plate 10. The injection hole 20JK passes through the second substrate 201, the second electrode layer 202, and the second hydrophobic layer 203. One or more injection holes 20JK may be provided to accommodate injection needs of a variety of to-be-reacted solutions with a trace amount. In some embodiments, at least one injection hole 20JK and multiple second hollow holes 20K corresponding to the first hollow holes 10K1 are arranged on the side of the second base plate 20. The second electrode layer 202 only needs to be connected to a fixed common potential to form an electric field with the drive electrode 1031 of the first electrode layer 103. The electrical field is used to drive droplets to travel. Hence, the body of the second electrode layer 202 except the second hollow hole 20K and the injection hole 20JK may be an integrated connection structure. It is beneficial to improve the process efficiency of the second electrode layer 202 on the side of the second base plate 20.

As aforementioned, the second base plate 20 has the injection hole 20JK on the side facing the first base plate 10 in some embodiments. Further, a structure is arranged at the position of the injection hole 20JK for the first unit 00A. As such, after a sample is injected, the sample may be controlled by the micro-fluidic unit circuit 00A1 at the first unit 00A. Thus droplets of a sample may travel along a desired route.

Referring to FIGS. 8 and 9, in some cases along the Z direction, the layer where the organic semiconductor part T2P is located is on a side of a layer where the inorganic transistors T1 are located away from the first substrate 101.

The inorganic transistors T1 are generally fabricated using high-temperature processes, while the organic semiconductor parts T2P of the organic transistors T2 can only be made through a low-temperature process (e.g., below 120 degrees Celsius). If the layer structure of the organic semiconductor parts T2P is located below layers where the inorganic transistor T1 is located, high temperatures may affect the performance of the organic transistor T2, when the inorganic transistors T1 go through a high-temperature process. It may cause the performance of the organic transistor T2 to deteriorate or the organic transistor T2 may even fail. In some embodiments, the layer where the organic semiconductor part T2P is located is on a side of the layer where the inorganic transistor T1 is located away from the first substrate 101 along the Z direction. After the layer structure of the inorganic transistor T1 with a high-temperature process is formed on the first substrate 101, the layer structure of the organic semiconductor part T2P of the organic transistor T2 with a low-temperature process is formed. It may avoid the problem of performance failure of the organic semiconductor part T2P resulting from high temperatures.

The inorganic transistor T1 may include a gate T1G, a source T1S, a drain T1D, an inorganic semiconductor part T1P, etc. The organic transistor T2 may include a gate T2G, a source T2S, a drain T2D, an organic semiconductor part T2P, etc. Organic insulating layers T2J may be deposited between conductive layers of the organic transistor T2 to provide insulation.

Referring to FIGS. 8 and 9, in some embodiments, the organic transistor T2 is a dual-gate organic transistor and includes a first gate electrode T2G1 and a second gate electrode T2G2. The layer where the first gate electrode T2G1 is located is on a side of the layer where the second gate electrode T2G2 is located facing the first substrate 101. The first gate electrode T2G1 is connected to the sensitive electrode MP.

As mentioned above, the organic transistor T2 may be a dual-gate organic transistor. One of the gate electrodes of the organic transistor T2, such as the first gate electrode T2G1, may be connected to the sensitive electrode MP. The sensitive electrode MP is exposed to solutions to be detected, contacts the solutions, and adsorbs ions or molecular structures required to be detected in the solutions. The other gate electrode of the organic transistor T2, such as the second gate electrode T2G2, may be used to control the organic transistor T2 to operate in a sub-threshold range. It ensures the conduction operation of the organic transistor T2.

The material system of dual-gate organic transistor devices is more suitable for biochemical reactions. As a sensing front-end, dual-gate organic transistors have the function of in-situ signal amplification. The function implemented by the micro-fluidic unit circuit 00A1 at the first unit 00A is to change the drive electric field intensity between the drive electrode 1031 and the second electrode layer 202, thereby controlling the movement of droplets in the droplet travel layer 30. The dual-gate organic transistor is configured at the second unit 00B. Biochemical reactions on the sensitive electrode MP require direct contact with droplets to be measured. Thus, the first hollow hole 10K1 is formed in the first hydrophobic layer 104 on a side of the first base plate 10. After a sample to be tested enters the first hollow hole 10K1, the sample does not need to go to other locations. Therefore, there is no need to set the micro-fluidic unit circuit 00A1 and the drive electrode 1031 at the position of the dual-gate organic transistor. Dual-gate organic transistors may replace the micro-fluidic unit circuit 00A1 and drive electrode 1031 at the same position. Organic and inorganic transistors are heterogeneously integrated. The combination of the two through heterogeneous integration may well introduce biochemical reactions and signal in-situ amplification into existing micro-fluidic base plates. The material system of the current mature micro-fluidic substrate process is not suitable for sensing applications using modifying and anchoring biochemical sensing materials. That is, the currently mature micro-fluidic base plates (or substrates) mainly implement reactions between different solutions. If organic transistor detection technology alone is used to achieve micro-fluidic detection, the process of organic transistors may limit the ability to reduce the area of detection unit. This may lead to a large demand for test samples. The present disclosure provides methods and systems that heterogeneously integrate the dual-gate organic transistor process with currently mature micro-fluidic substrate processes. It does not consume additional space resources on the substrate and just provides a replacement in situ. It may also greatly reduce the demand for samples. A trace amount of sample may complete a required reaction and detection at the sensitive electrode MP connected to the organic transistor T2 of the second unit 00B. It is helpful to speed up the concentration change of a substance to be measured in a sample and further shorten the detection time.

Figure 10:
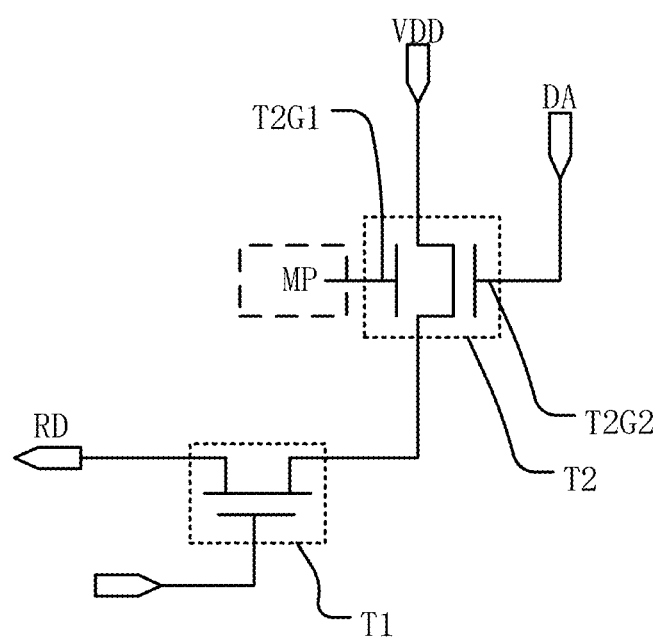
FIG. 10 shows a schematic diagram of a circuit connection structure of a detection unit circuit included in a second unit in FIG. 9 according to various disclosed embodiments of the present disclosure.

FIG. 10 illustrates a schematic diagram of a circuit connection structure of a detection unit circuit included in the second unit 00B in FIG. 9 according to the present disclosure. In the detection unit circuit 00B1, the first electrode of the organic transistor T2 is electrically connected to the first electrode of at least one inorganic transistor T1, and the second electrode of the organic transistor T2 is connected to a first power signal line VDD for providing a first power signal for the entire detection unit circuit 00B1. The first power signal line VDD may be disposed in a certain conductive layer of the drive array layer 102. The second electrode of the inorganic transistor T1 is connected to a read signal line RD. The second gate electrode T2G2 of the organic transistor T2 is connected to a first fixed potential signal line DA.

As aforementioned, the second unit 00B includes the detection unit circuit 00B1. The organic transistor T2 in the detection unit circuit 00B1 may have a dual-gate structure. The second gate electrode T2G2 of the top gate is connected to the first fixed potential signal line DA. The first fixed potential signal line DA may be disposed in the drive array layer 102 to control the organic transistor T2 to operate in a sub-threshold region, and make the organic transistor T2 turn on. The first gate electrode T2G1 of the bottom gate is connected to the sensitive electrode MP. The second gate electrode T2G2 of the top gate connected to the first fixed potential signal line DA is beneficial to amplifying signals of the sensitive electrode MP. The layer where the sensitive electrode MP is located may be in a relatively upper position at the first base plate 10, so that the sensitive electrode MP may fully contact with solutions to be detected. When detecting the concentration of biomolecules or ions, the sensitive electrode MP may be a biomolecule or ion sensitive electrode. The ions in the solutions to be detected are relatively easy to adsorb to the surface of the sensitive electrode MP, thereby changing the potential of the sensitive electrode MP. At this time, the potential of the first gate electrode T2G1 of the bottom gate also changes accordingly, which in turn causes the threshold voltage of the organic transistor T2 to change, thereby causing the output current of the organic transistor T2 to change. After reading the read signal line RD connected to the second electrode of the inorganic transistor T1 of the detection unit circuit 00B1, the output change of the detected electrical signal is obtained, thereby realizing the sensing of biomolecule or ion signals in the solutions to be detected.

FIG. 10 only exemplarily illustrates an electrical connection structure of the detection unit circuit 00B1 at the second unit 00B. In some other embodiments, electrical connection structures included in the detection unit circuit 00B1 are not limited to this configuration, and may also contain other electrical connection structures. For example, the detection unit circuit 00B1 may include other transistors with functions to reset, amplify, or output signals. The present disclosure does not limit such additional structures and functions, as long as the detection unit circuit 00B1 may detect and output signals.

As aforementioned, the organic transistor T2 in the detection unit circuit 00B1 may include a dual-gate structure. In some embodiments, the second gate electrode T2G2 of the top gate is connected to the first fixed potential signal line DA. That is, the second gate electrode T2G2 has a fixed potential. Then, the second gates electrode T2G2 of the organic transistors T2 of each second unit 00B may be connected together (not shown) and controlled by the same first fixed potential signal line DA to provide a fixed potential value, which helps reduce the number of signal traces laid out in the first base plate.

Referring to FIGS. 8 and 9, the organic transistor T2 is a dual-gate organic transistor. A bottom gate insulating layer T2J1 is between the layer where the first gate electrode T2G1 of the bottom gate is located and the layer where the organic semiconductor part T2P of the organic transistor T2 is located. Between the layer where the second gate electrode T2G2 is located and the layer where the organic semiconductor part T2P of the organic transistor T2 is located is a top gate insulating layer T2J2.

In some cases, the organic transistor T2 at the second unit 00B includes a dual-gate structure. The unit area capacitance of the bottom gate insulating layer T2J1 is greater than that of the top gate insulating layer T2J2. As such, the first gate electrode T2G1 of the bottom gate may have a stronger channel control ability of the organic transistor T2. The first gate electrode T2G1 is connected to the sensitive electrode MP. The detection sensitivity of the detection unit circuit 00B1 of the overall second unit 00B may be made higher.

In some embodiments, the unit area capacitance of the bottom gate insulating layer T2J1 is greater than that of the top gate insulating layer T2J2. The unit area capacitance of the bottom gate insulating layer T2J1 may be considered as the plate capacitance formed by the overlap of the first gate electrode T2G1 and the organic semiconductor part T2P of the organic transistor T2. The unit area capacitance of the top gate insulating layer T2J2 may be considered as the plate capacitance formed by the overlap of the second gate electrode and the organic semiconductor part of the organic transistor. Along the Z direction, the overlapping area S1 of the first gate electrode T2G1 and the organic semiconductor part T2P of the organic transistor T2 is larger than the overlapping area S2 of the second gate electrode and the organic semiconductor part T2P of the organic transistor. The larger the overlapping area S1, that is, the larger the facing area of the first gate electrode T2G1 and the organic semiconductor part T2P, the larger the unit area capacitance of the bottom gate insulating layer T2J1. In some cases, the thickness D1 of the bottom gate insulating layer T2J1 is smaller than the thickness D2 of the top gate insulating layer T2J2 along the Z direction. The smaller the distance between the first gate electrode T2G1 and the organic semiconductor part T2P of the organic transistor T2, the greater the unit area capacitance of the bottom gate insulating layer T2J1 formed.

Besides the structures illustrated above, there are other structures that makes the unit area capacitance of the bottom gate insulating layer T2J1 greater than that of the top gate insulating layer T2J2. For example, certain materials may be used to enhance it.

Figure 11:
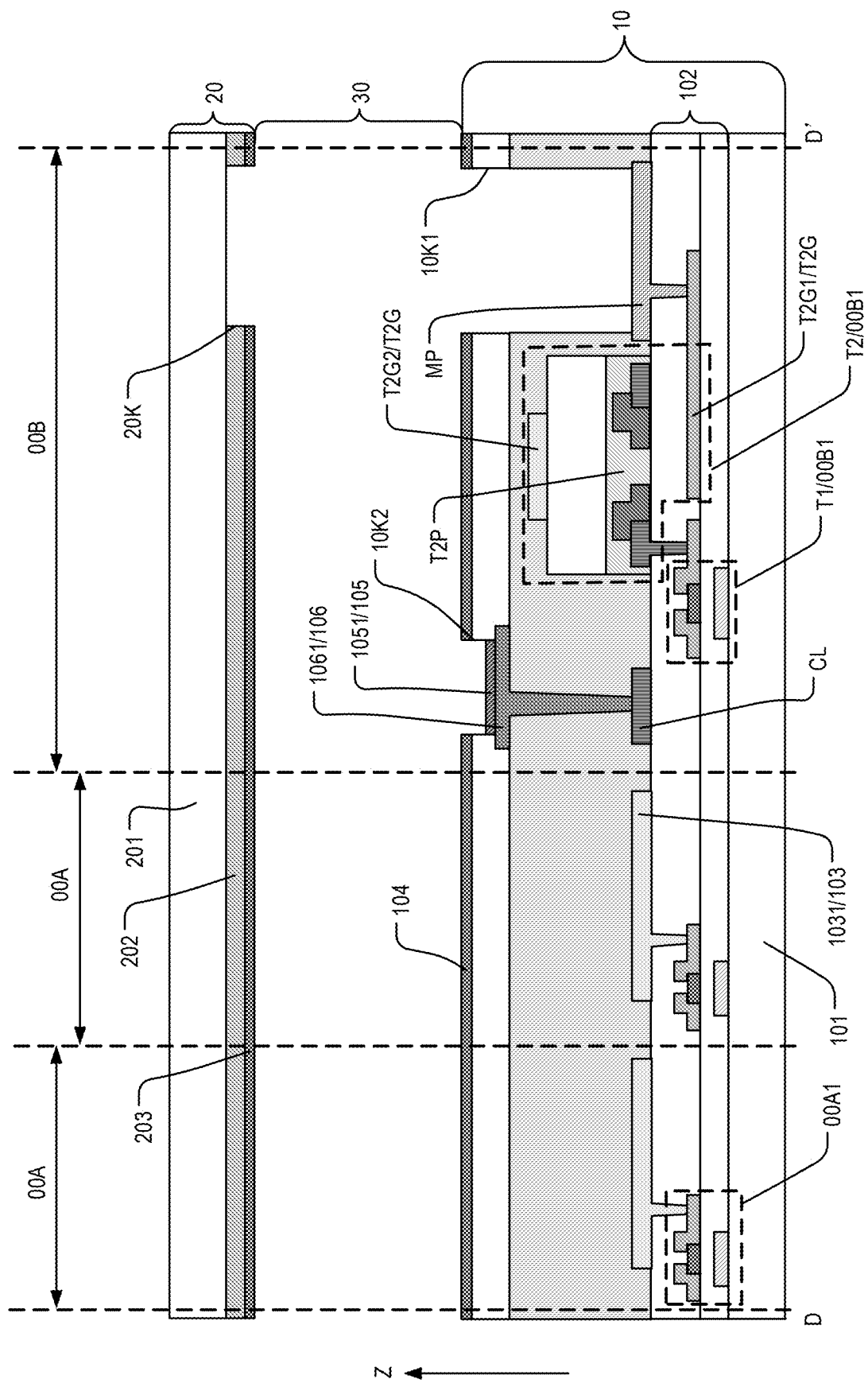
FIG. 11 shows a schematic cross-sectional structural diagram along a D-D' direction in FIG. 8 according to various disclosed embodiments of the present disclosure.

FIG. 11 illustrates a schematic cross-sectional structural diagram along a D-D' direction in FIG. 8 according to the present disclosure. In some embodiments, the first base plate 10 also includes a third electrode layer 105 located on a side of the drive array layer 102 away from the first substrate 101.

In the second unit 00B, the third electrode layer 105 includes a reference electrode 1051.

In the second unit 00B, the side of the first base plate 10 facing the second base plate 20 includes a third hollow hole 10K2. The third hollow hole 10K2 at least penetrates the first hydrophobic layer 104. The third hollow hole 10K2 exposes the reference electrode 1051.

As aforementioned, the second unit 00B includes the detection unit circuit 00B1 and the reference electrode 1051. In some embodiments, the third electrode layer 105 where the reference electrode 1051 is located may be on a side of the drive array layer 102 away from the first substrate 101. As shown in FIG. 11, the third electrode layer 105 is located on a side of a layer where the organic transistor T2 is located away from the first substrate 101. In some other embodiments, the third electrode layer 105 may also be located at any layer position on a side of the drive array layer 102 away from the first substrate 101. The embodiments do not limit this, as long as the third electrode layer 105 where the reference electrode 1051 is located is relatively close to the side of the first base plate 10 facing the second base plate 20, so as to facilitate forming the third hollow hole 10K2 exposing the reference electrode 1051. It prevents the depth of the third hollow hole 10K2 from being too deep and affecting the process efficiency and process difficulty. In some cases at the second unit 00B, the third hollow hole 10K2 that at least penetrates the first hydrophobic layer 104 is formed on the side of the first base plate 10 facing the second base plate 20. The third hollow hole 10K2 exposes the reference electrode 1051. When detecting solutions of a sample to be detected, the sample to be detected may be brought into contact with the reference electrode 1051 in the third hollow hole 10K2. The reference electrode 1051 is the reference comparison electrode, and the purpose is to accurately determine the potential fluctuation of the sensitive electrode MP during detection. After solutions to be detected contact the reference electrode 1051, the reference electrode 1051 remains a stable fixed potential. The fixed potential obtained after the reference electrode 1051 contacts the solutions to be detected is transmitted to a control and signal transmission circuit system for data comparison processing. Then, the stable fixed potential obtained by the reference electrode 1051 may be compared with subsequent detection values of the sensitive electrode MP to obtain required detection data.

Optionally, the third electrode layer 105 where the reference electrode 1051 is located may be made of transparent conductive materials. The reference electrode 1051 may also be made of other materials, as long as it forms a relatively stable reference potential after contacting solutions to be detected.

In some embodiments, fabrication materials used to make the first electrode layer 103 of the drive electrode 1031 at the first unit 00A may include a transparent conductive material, such as indium tin oxide (ITO), indium zinc oxide (IZO), etc. The third electrode layer 105 and the first electrode layer 103 may have different fabrication materials. ITO and IZO are limited by their material composition and electrochemical reaction potential and are not used to make reference electrodes. When making the drive electrode 1031 in the first electrode layer 103, transparent conductive materials such as ITO and IZO are generally selected. The fabrication material of the third electrode layer 105 includes any one of Ag/AgCl, Hg/HgO, and calomel, which are different from the fabrication material of the first electrode layer 103.

The reference electrode 1051 is a specific chemical electrode whose purpose is to output a sufficiently stable reference voltage value after contacting solutions to be detected. The reference electrode 1051 may be an Ag/AgCl electrode, a Hg/HgO electrode, a calomel electrode, such as a saturated calomel electrode, etc. Among them, the calomel electrode (Hg/Hg2Cl2) is a commonly used reference electrode, which is formed by mercury contacting mercury chloride in a saturated solution of a potassium chloride (KCl) aqueous solution. At a certain temperature, when the Cl concentration in the KCl solution is fixed, the calomel electrode potential is a constant value, so it may be used as the reference electrode 1051 in some embodiments.

Usually, different reference electrodes can be used for electrolytes with different properties. For example, the calomel electrode is a commonly used electrode. If the electrolyte is alkaline or even a strong alkaline solution, the Hg/HgO electrode may be used. For another example, if a solution to be detected is a saturated KCl solution, the reference electrode 1051 may be an Ag/AgCl electrode. After the Ag/AgCl reference electrode contacts the saturated KCl solution, the electrode potential is stably 0.198V at room temperature. The stable reference potential may be transmitted to the integrated circuit (IC) of the control and signal transmission circuit system or other processing modules for reference processing. Subsequent reference comparison is made with detection values of the sensitive electrode MP to obtain the required detection data.

Since the potential of the reference electrode after contacting a solution to be detected is not affected by the circuit capacitance, resistance, IC model, and circuit design, it may ensure that detection values obtained by the sensitive electrode MP are more accurate. Assuming the stable potential obtained by the reference electrode is not used, but a common potential such as com signals given by an IC or control circuit is used as the reference potential. The common potential given by this IC or control circuit cannot achieve sufficient accuracy and stability, and may fluctuate up or down by 5% or more at a set point (for example, the com signal is 1V). When solutions to be detected by the micro-fluidic detection device come into contact with the sensitive electrode MP, the fluctuations produced by the sensitive electrode MP are small (such as less than 5%). If the COM signal is used as the reference electrical signal, it is impossible to confirm whether tiny fluctuations detected by the sensitive electrode MP during detection are caused by a small amount of target detection substance in the sample or the potential error of the COM signal itself. Then, the accuracy of detection cannot be guaranteed. In some embodiments, when solutions to be detected have relatively small impact on potential fluctuations of the sensitive electrode MP, a stable potential of the reference electrode is used as a reference. After contacting solutions to be detected, the reference electrode outputs a sufficiently stable reference voltage value to ensure the detection accuracy.

Figure 12:
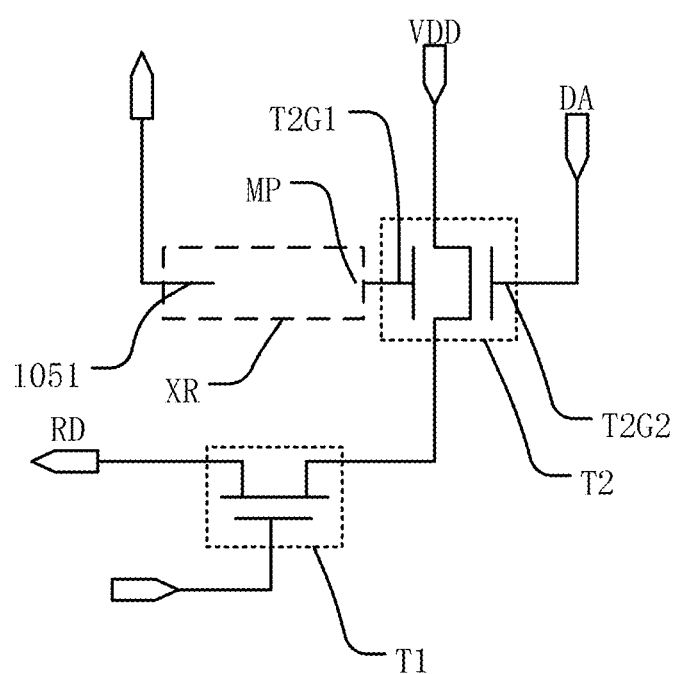
FIG. 12 shows a schematic diagram of a circuit connection structure of a detection unit circuit included in a second unit in FIG. 11 according to various disclosed embodiments of the present disclosure.

FIG. 12 shows a schematic diagram of a circuit connection structure of a detection unit circuit included in the second unit in FIG. 11 according to the present disclosure. Referring to FIGS. 8, 11, and 12, in the detection unit circuit 00B1, the organic transistor T2 may have a dual-gate structure. The second gate electrode T2G2 of the top gate is connected to a first fixed potential signal line DA. The first fixed potential signal line DA may be disposed in the drive array layer 102 to control the organic transistor T2 to operate in a sub-threshold region, so that the organic transistor T2 is turned on. The first gate electrode T2G1 of the bottom gate is connected to the sensitive electrode MP. The second gate electrode T2G2 of the top gate connected to the first fixed potential signal line DA is beneficial to amplifying signals of the sensitive electrode MP. The first electrode of the organic transistor T2 is electrically connected to the first electrode of the at least one inorganic transistor T1. The second electrode of the organic transistor T2 is connected to the first power signal line VDD for providing the first power signal for the entire detection unit circuit 00B1. The first power signal line VDD may be disposed in a certain conductive layer of the drive array layer 102. The second electrode of the inorganic transistor T1 is connected to the read signal line RD.

In some embodiments, in the detection unit circuit 00B1 included in the second unit 00B, the layer where the sensitive electrode MP is located may be at a relatively upper position of the first base plate 10. It makes the sensitive electrode MP fully contact with solutions to be detected. When the concentration of biomolecules or ions is detected, after the reference electrode 1051 contacts solutions to be detected, a fixed and stable potential is formed (The dotted box XR in FIG. 12 may be considered as solutions to be detected in contact with the sensitive electrode MP and the reference electrode 1051). It may be transmitted to the IC through other conductive layers of the drive array layer 102 for reference processing. The sensitive electrode MP may be a biomolecule or ion sensitive electrode. Ions in solutions to be detected are relatively easy to adsorb to the surface of the sensitive electrode MP, thereby changing the potential of the sensitive electrode MP. At this time, the potential of the first gate electrode T2G1 of the bottom gate also changes accordingly, which in turn causes the threshold voltage of the organic transistor T2 to change, thereby causing the output current through the organic transistor T2 to change. After reading through the read signal line RD connected to the second electrode of the inorganic transistor T1 of the detection unit circuit 00B1, by comparing it with the fixed potential given by the reference electrode 1051, the change of the detected electrical signals is generated. Then, biomolecule or ion signals in the solutions to be detected may be detected.

FIG. 12 only illustrates an electrical connection structure of the detection unit circuit 00B1 included in the second unit 00B. The electrical connection structure of the detection unit circuit 00B1 includes but is not limited to this, and may include other electrical connection structures. For example, the detection unit circuit 00B1 may also include other inorganic transistors with function to reset, amplify, and output signals. The embodiments do not limit this, as long as the detection unit circuit 00B1 has functions of detecting and outputting detection signals.

Figure 13:
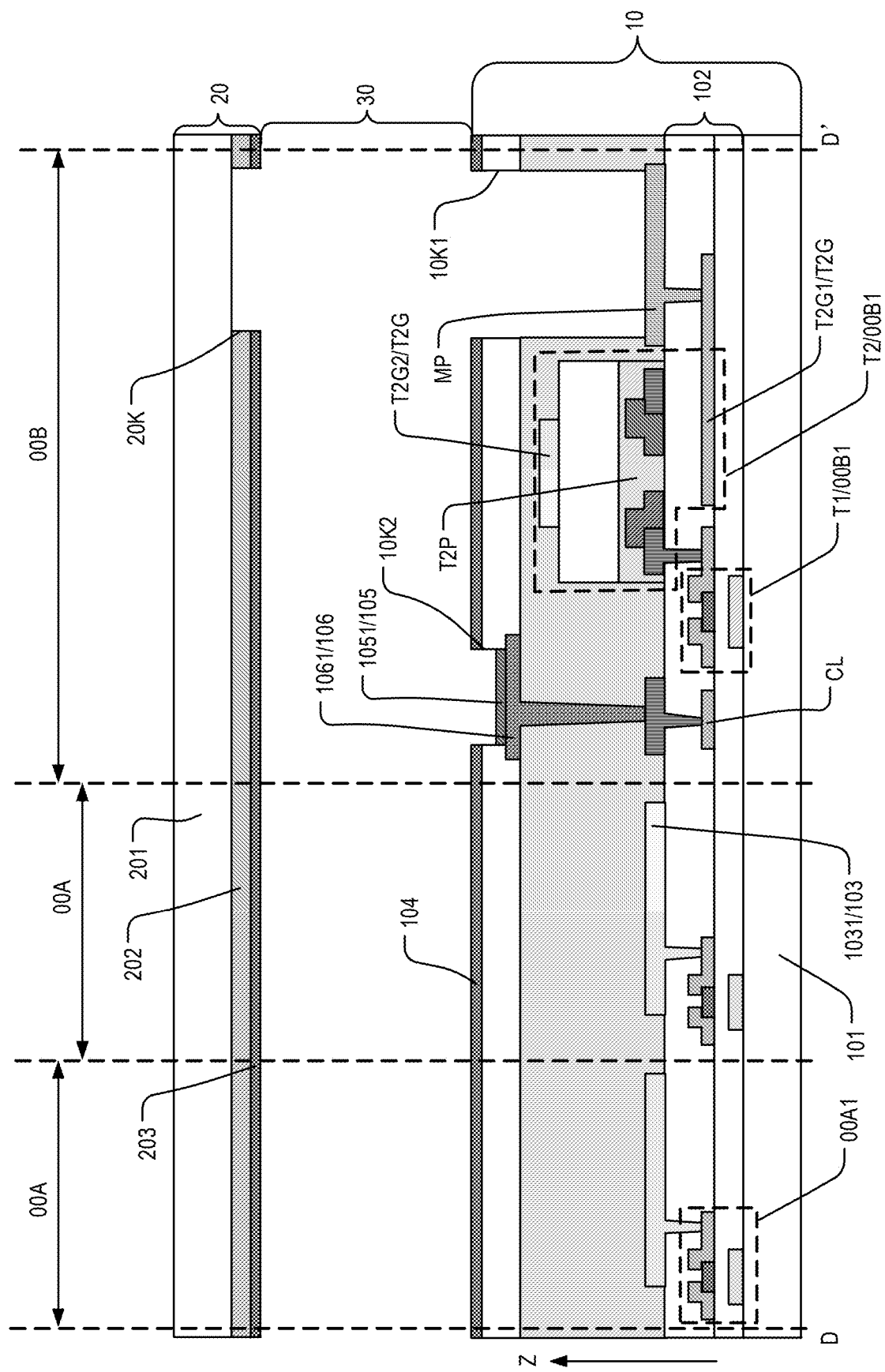
FIG. 13 shows another schematic cross-sectional structural diagram along the D-D' direction in FIG. 8 according to various disclosed embodiments of the present disclosure.
Figure 14:
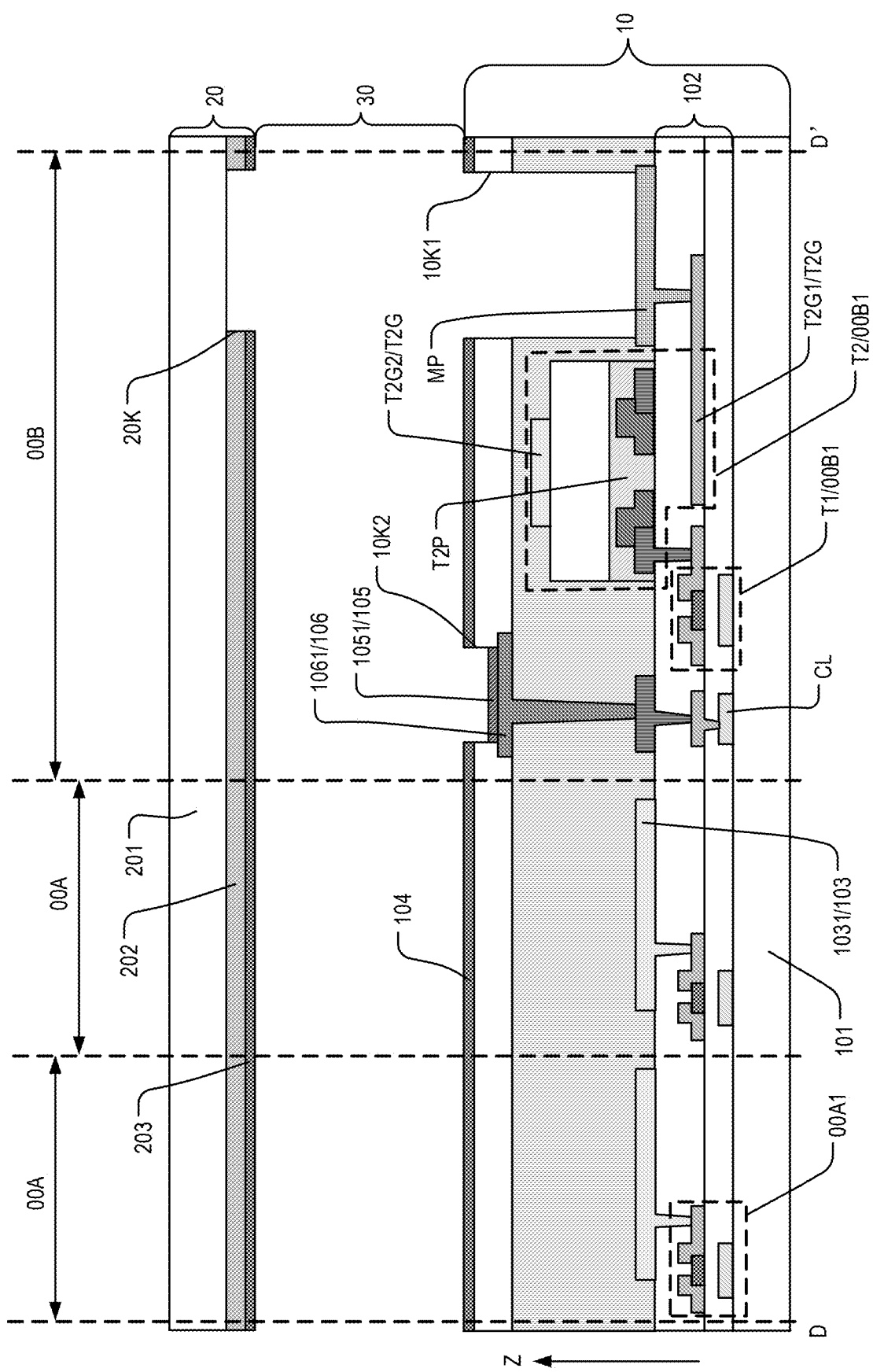
FIG. 14 shows another schematic cross-sectional structural diagram along the D-D' direction in FIG. 8 according to various disclosed embodiments of the present disclosure.

FIGS. 13 and 14 illustrate certain other schematic cross-sectional structural diagrams along the D-D' direction in FIG. 8 according to the present disclosure. Referring to FIGS. 8, 11, 13, and 14, in some embodiments, the third electrode layer 105 is located on a side of the first electrode layer 103 away from the first substrate 101. A connection layer 106 is between the third electrode layer 105 and the first electrode layer 103. The connection layer 106 includes a connection portion 1061.

At the second unit GOB, a side of the connecting portion 1061 facing the reference electrode 1051 is in direct contact with the reference electrode 1051. A side of the connection portion 1061 away from the reference electrode 1051 is connected to the reference potential reading line CL. The reference potential reading line CL is located in the drive array layer 102.

The reference electrode 1051 is used to form a fixed and stable reference potential after contacting solutions to be detected during detection. The reference potential needs to be transmitted to processing modules such as an IC for data processing, and then is arranged for subsequent reference comparison with signals detected by the sensitive electrode MP to obtain detection results required for detection. As such, the third electrode layer 105 is located on a side of the first electrode layer 103 away from the first substrate 101, so that the third electrode layer 105 where the reference electrode 1051 is located is closer to solutions to be detected in the droplet travel layer 30. The connection layer 106 made of conductive materials is provided between the third electrode layer 105 and the first electrode layer 103. The connection layer 106 is patterned to form the connection portion 1061. The connection part 1061 is used to electrically connect the reference electrode 1051 to the reference potential reading line CL in the drive array layer 102, so that the reference potential obtained by the reference electrode 1051 is transmitted to a processing module such as an IC through the connection portion 1061 and the reference potential reading line CL.

As shown in FIG. 11, the reference potential reading line CL is located in a conductive layer closest to the organic transistor T2 in the drive array layer 102. The reference potential reading line CL may also be located in other conductive layers of the drive array layer 102. As shown in FIG. 13, the reference potential reading line CL is located in a layer where the source and drain of the inorganic transistor T1 are located. As shown in FIG. 14, the reference potential reading line CL is located in a layer where the gate electrode of the inorganic transistor T1 is located.

Materials of the connection layer 106 may be metallic silver (Ag) conductive material. The connection portion 1061 of the connection layer 106 is in direct contact with and electrically connected to the reference electrode 1051, and is used to transmit the potential of the reference electrode 1051. The reference electrode 1051 is a specific chemical electrode. The purpose is to output a sufficiently stable reference voltage. The connection portion 1061, connected with the reference electrode 1051, may be made of metal Ag, which is relatively more compatible with the production process of the substrate layer.

The reference electrode 1051 forms a fixed and stable reference potential after contacting solutions to be detected during detection. The reference potential subsequently needs to be transmitted to processing modules such as ICs for data processing, so that it may be compared with signals detected by the sensitive electrode MP to obtain detection results required for detection. Then, reference electrodes 1051 of different second units 00B may be electrically connected to each other. That is, the reference electrodes 1051 of each second unit 00B at the micro-fluidic detection device 000 may be connected together. Thereafter, reference potentials are transmitted to the processing module for data processing through the same peripheral reference potential reading bus. Alternatively, reference electrodes 1051 of each second unit 00B may be independent of each other, and the reference potential reading lines CL connected to the reference electrodes 1051 of each second unit 00B may be connected together for subsequent transmission to the processing module for data processing.

Figure 15:
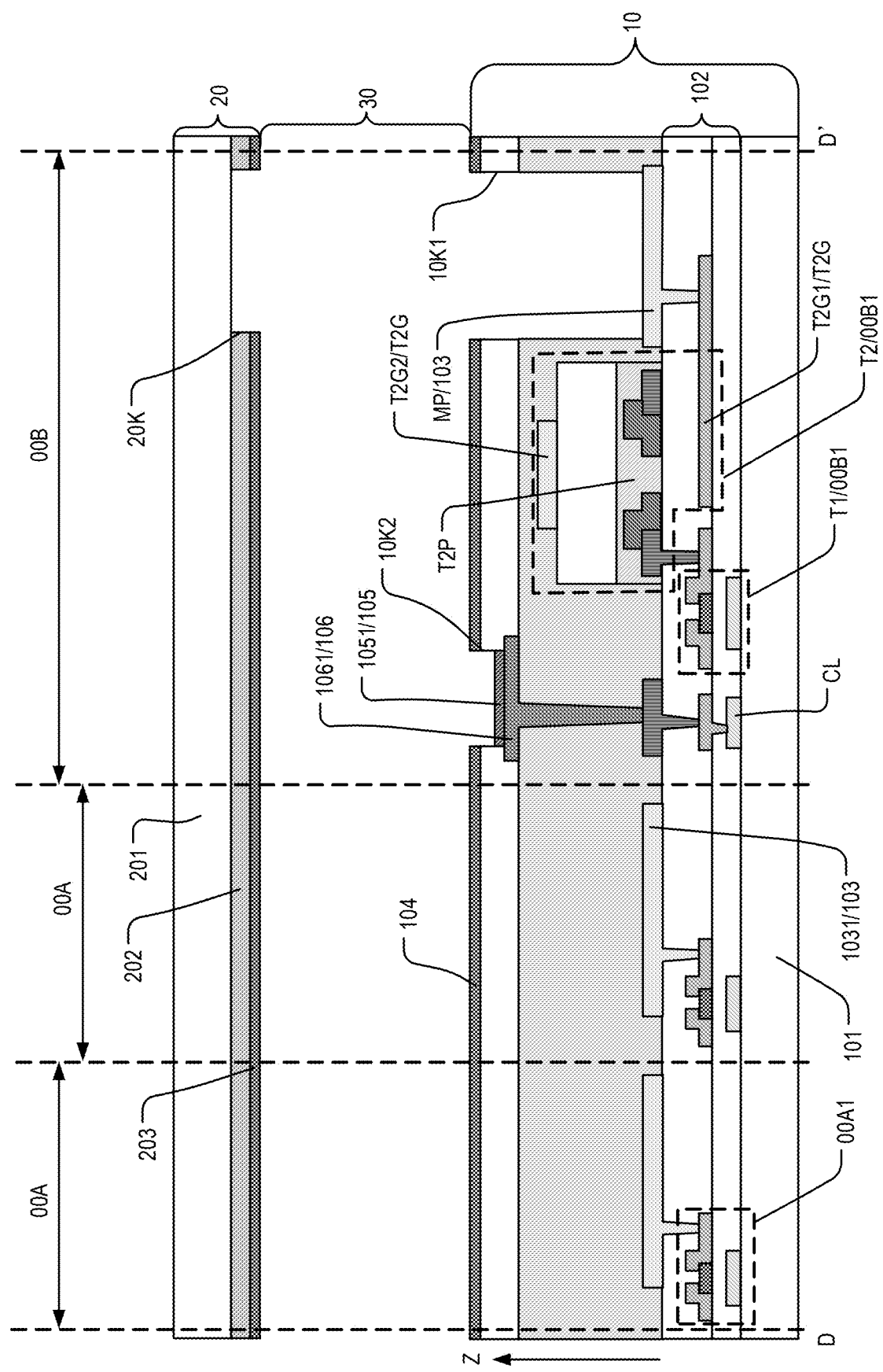
FIG. 15 shows another schematic cross-sectional structural diagram along the D-D' direction in FIG. 8 according to various disclosed embodiments of the present disclosure.

FIG. 15 illustrates another schematic cross-sectional structural diagram along the D-D' direction in FIG. 8 according to the present disclosure. In some cases, the sensitive electrode MP is located in the first electrode layer 103. The sensitive electrode MP may be disposed in the first electrode layer 103 together with the drive electrode 1031 of the first unit 00A (In FIG. 15, the same filling pattern is used to indicate that the drive electrode 1031 and the sensitive electrode MP are in the same layer). That is, part of the first electrode layer 103 is used to make the sensitive electrode MP. The sensitive electrode MP may be made of materials such as ITO or IZO. The sensitive electrode MP is made of the same material as the drive electrode 1031 of the first unit 00A, and may be used to identify hydrogen ions in solutions to be detected and detect the hydrogen ion concentration. The sensitive electrode MP is located in the first electrode layer 103, which may avoid the need for another layer in the first base plate 10 to produce the sensitive electrode MP. It is conducive to reducing the overall layer number and thinning the thickness of the layers of the first base plate 10, which in turn is conducive to thinning the overall thickness of the micro-fluidic detection device 000.

When materials of the sensitive electrode MP are ITO or IZO, the layer where the sensitive electrode MP is located may be the first electrode layer 103. That is, it is made of the same material as the drive electrode 1031. Optionally, the sensitive electrode MP may have a stacked structure that includes the first electrode layer 103 and a transparent conductive material layer in the drive array layer 102 (e.g., the sensitive electrode MP may be a stacked structure of double-layer ITO, not shown in FIG. 15). When the sensitive electrode MP is made of transparent conductive materials such as ITO or IZO, it is mainly used for testing hydrogen ions. Thus, its surface does not need to be modified with biological probes.

Figure 16:
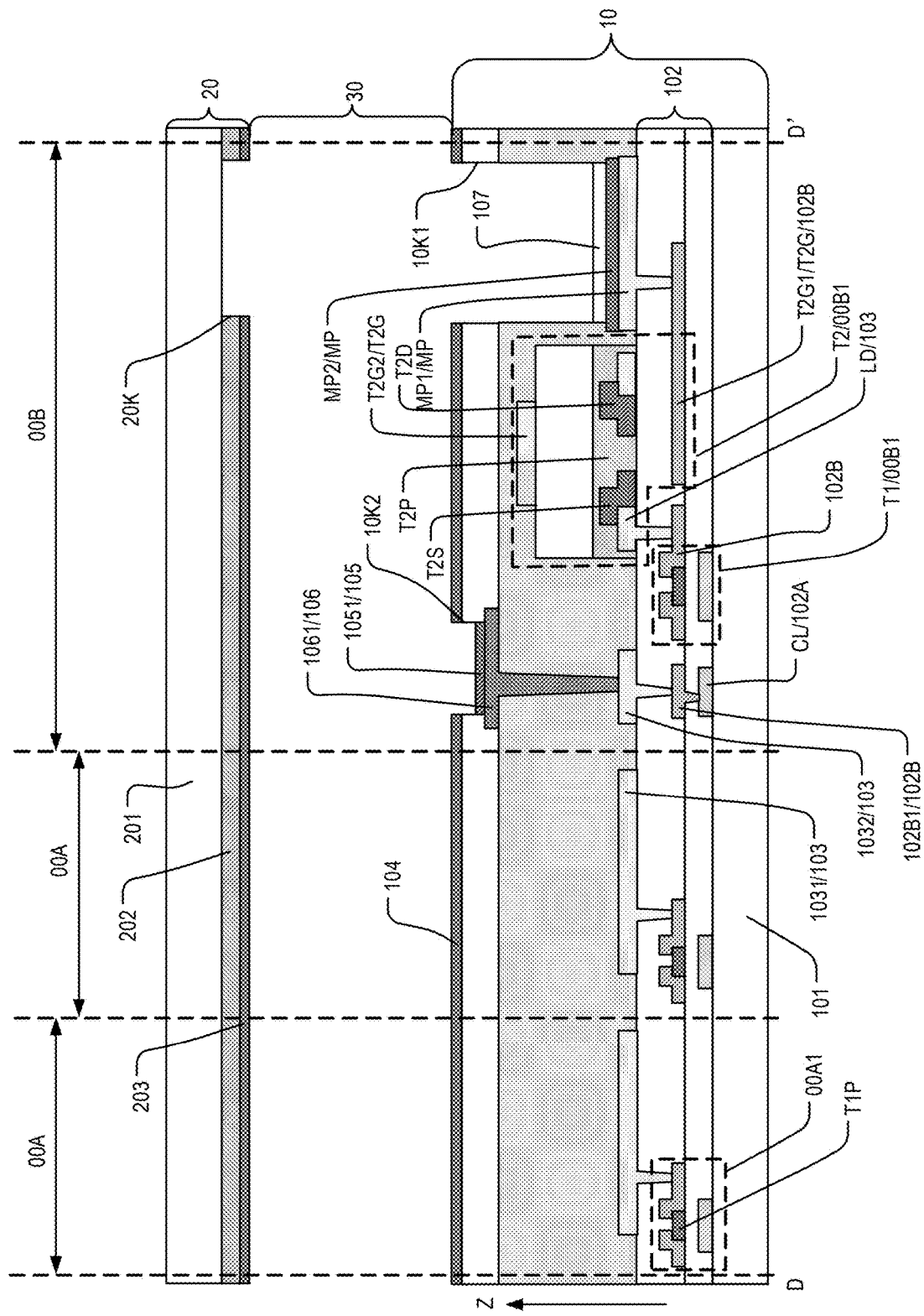
FIG. 16 shows another schematic cross-sectional structural diagram along the D-D' direction in FIG. 8 according to various disclosed embodiments of the present disclosure.

FIG. 16 illustrates another schematic cross-sectional structural diagram along the D-D' direction in FIG. 8 according to the present disclosure. In some embodiments, the fabrication material of the sensitive electrode MP is different from that of the first electrode layer 103. The layer where the sensitive electrode MP is located is on a side of the first electrode layer 103 away from the first substrate 101.

For example, if the first electrode layer 103 is made of transparent conductive materials such as ITO or IZO, the sensitive electrode MP may be made of metallic conductive materials. If the layer where the sensitive electrode MP is located is on a side of the first electrode layer 103 away from the first substrate 101, the sensitive electrode MP may be made by selecting a metal layer closest to the drive array layer 102 among the layers where the organic transistor T2 is located.

Optionally, when the sensitive electrode MP is made of a metallic conductive material, a side of the sensitive electrode MP in the first hollow hole 10K1 and away from the first substrate 101 includes a modification portion 107.

The modification portion 107 may be a biological probe modification structure, such as a modification part used to modify chemical groups such as thiols, to realize the detection of specific biological groups by the sensitive electrode MP. The sensitive electrode MP may be made of metallic conductive materials, such as metal gold (Au). If the sensitive electrode MP made of Au material without biomolecule probe modification on the surface is exposed to solutions to be detected, the sensitive electrode MP may be a simple conductive structure without the ability to recognize specific ions or biomolecules. The surface of a sensitive electrode MP modified by biomolecule probes through the modification portion 107 has the adsorption function of specific ions or biomolecules, so that it may sense specific ions or biomolecules. It helps ensure the sensing effect of the sensitive electrode MP on certain ions or biomolecules.

When the sensitive electrode MP is made of Au, its surface may be modified with a specific biological probe as the modification portion 107. This allows the sensitive electrode MP to specifically recognize and bind to DNA (deoxyribonucleotide)/RNA (ribonucleotide) sequences, allows a chemical group to generate binding force with metal Au, and anchor the chemical group on the surface of the sensitive electrode MP of metallic Au. In some cases, the chemical groups include but are not limited to thiols.

In some embodiments, as shown in FIG. 16, the sensitive electrode MP may be made by using a metal layer closest to the drive array layer 102 among the layers where the organic transistor T2 is located. If the sensitive electrode MP is made of metal Au, and the sensitive electrode MP is made using a layer where the source electrode T2S and drain electrode T2D of the organic transistor T2 are located, it is necessary to set the modification portion 107 on the surface of the sensitive electrode MP facing solutions to be detected, so as to realize the modification of a biomolecule probe on the surface. In some other embodiments, the sensitive electrode MP may also be a two-layer stacked structure. For example, the sensitive electrode MP may be a two-layer stacked structure of transparent conductive materials such as ITO or IZO and metal Au materials. As shown in FIG. 16, the sensitive electrode MP includes a stacked first part MP1 and a second part MP2. The first part MP1 of the sensitive electrode MP is made using the first electrode layer 103 (transparent conductive materials such as ITO or IZO). The second part MP2 is made using a layer where the source electrode T2S and the drain electrode T2D of the organic transistor T2 are located. The first part MP1 made of transparent conductive materials such as ITO or IZO is used to achieve electrical connection with the first gate electrode T2G1 of the underlying organic transistor T2. The second part MP2 made of metal Au in the upper layer is used to contact solutions to be detected. A modification portion 107 may be provided on the surface of the sensitive electrode MP made of metal Au (i.e., the surface of the second part MP2) to achieve the sensing effect of specific ions or biomolecules.

In some embodiments, if the first part MP1 of the sensitive electrode MP is not made of transparent conductive materials, a third conductive layer (not shown) may be provided on a side of the drive array layer 102 close to the first electrode layer 103, so that the first part MP1 may be made using the additional third conductive layer.

In some embodiments, the drive array layer 102 may include a first metal layer 102A and a second metal layer 102B in the layer structure of the first base plate 10. The first metal layer 102A may be used to form the gate electrode of the inorganic transistor T1. The first metal layer 102A may also be used to form the reference potential reading line CL. The second metal layer 102B may be used to form the source and drain of the inorganic transistor T1, and the second metal layer 102B may also be used to form the first gate electrode T2G1 of the organic transistor T2. The first electrode layer 103 is located on a side of the second metal layer 102B away from the first substrate 101 and used to make the drive electrode 1031 and the first part MP1 of the sensitive electrode MP. The connection layer 106 is located on a side of the first electrode layer 103 away from the first substrate 101. The third electrode layer 105 is located on a side of the connection layer 106 away from the first substrate 101. In some cases, the second gate electrode T2G2 of the organic transistor T2 may be made of the same material as the first electrode layer 103. In some other cases, the second gate electrode T2G2 of the organic transistor T2 may also be made of other conductive materials such as metal Au.

In some embodiments, when the layer structure of the first base plate 10 is fabricated, the first metal layer 102A is formed on a side of the first substrate 101 to form the reference potential reading line CL and the gate electrode of the inorganic transistor T1. The layer where the active part of the inorganic transistor T1 is located is made to form the active part of the inorganic transistor T1. The second metal layer 102B is fabricated to form the source and drain of the inorganic transistor T1, the first gate electrode T2G1 of the organic transistor T2, the reference potential reading line CL, and a connection sub-section 102B1 of the reference electrode 1061. The first electrode layer 103 is produced to form the first part MP1 of the sensitive electrode MP, the drive electrode 1031, the reference potential reading line CL, and another connection sub-section 1032 of the reference electrode 1061 located in the first electrode layer 103. A layer of the source electrode T2S and drain electrode T2D of the organic transistor T2 is deposited and patterned on a side of the first electrode layer 103 away from the first substrate 101, forming the source T2S and a drain T2D of organic transistor T2. The source T2S and drain T2D of the organic transistor T2 may be made of metal Au. Furthermore, the second part MP2 of the sensitive electrode MP is formed simultaneously in the layer where the source electrode T2S and drain electrode T2D are located. The first part MP1 and second part MP2 are stacked together to form the sensitive electrode MP. The organic semiconductor part T2P of the organic transistor T2 is made. Thereafter, the organic insulating layer T2J and second gate electrode T2G2 of the organic transistor T2 are formed. The second gate electrode T2G2 may be made of transparent conductive materials such as ITO or IZO or in some cases, metal Au. An insulating layer covering the organic transistor T2 is deposited. A via hole is formed in the insulating layer that exposes the connection sub-section of the first electrode layer 103. The connection portion 1061 of the connection layer 106 is formed above the via hole. Another insulating layer is formed above the connection layer 106. The first hollow hole 10K1 and a third hollow hole 10K2 are etched that expose the sensitive electrode MP. The modification portion 107 is formed in the first hollow hole 10K1. Further, formation of the reference electrode 1051 and the hydrophobic layer is completed.

Referring to FIGS. 8, 12 and 16, in detection unit circuit 00B1, the first electrode of the organic transistor T2 is electrically connected to the first electrode of at least one inorganic transistor T1, the second electrode of the organic transistor T2 is connected to the first power supply signal line VDD, and the second electrode of the inorganic transistor T1 is connected to the read signal line RD. The first electrode of the organic transistor T2 may be electrically connected to the first electrode of the inorganic transistor T1 through a first conductive portion LD. Along the Z direction, the layer where the first conductive portion LD is located is between the layer where the first electrode of the organic transistor T2 is located and the layer where the first electrode of the inorganic transistor T1 is located. Optionally, the fabrication material of the first conductive portion LD includes any one of metal materials and metal oxide materials. Preferably, the material of the first conductive portion LD may be a transparent metal oxide material. That is, the first conductive portion LD may be located in the first electrode layer 103. As shown in FIG. 16, the first conductive portion LD is located in the first electrode layer 103 as an example for illustration.

In some embodiments, the connection between the first electrode of the organic transistor T2 and the first electrode of the inorganic transistor T1 may be realized through the first conductive portion LD. The first conductive portion LD may not only play an electrical connection role, but also play a role in protecting the via holes. Layers above the second metal layer 102B where the first electrode of the inorganic transistor T1 is located are made through an organic transistor manufacturing process. The first electrode of the organic transistor T2 (the source electrode T2S and drain electrode T2D of the organic transistor T2) is generally made of metal Au or metal Ag. If the first electrode of the organic transistor T2 is directly made in a via hole that exposes the first electrode of the inorganic transistor T1, the manufacturing process of metal Au or metal Ag may bring risks of corrosion to the first electrode of the inorganic transistor T1. This is not conducive to ensuring the process yield of the device. As such, before the organic transistor fabrication process, the first conductive portion LD is formed in the via hole that exposes the first electrode of the inorganic transistor T1. This may play a role in protecting the first electrode of the inorganic transistor T1. It is helpful to avoid the risk of corrosion caused by the exposed first electrode of the inorganic transistor T1.

Figure 17:
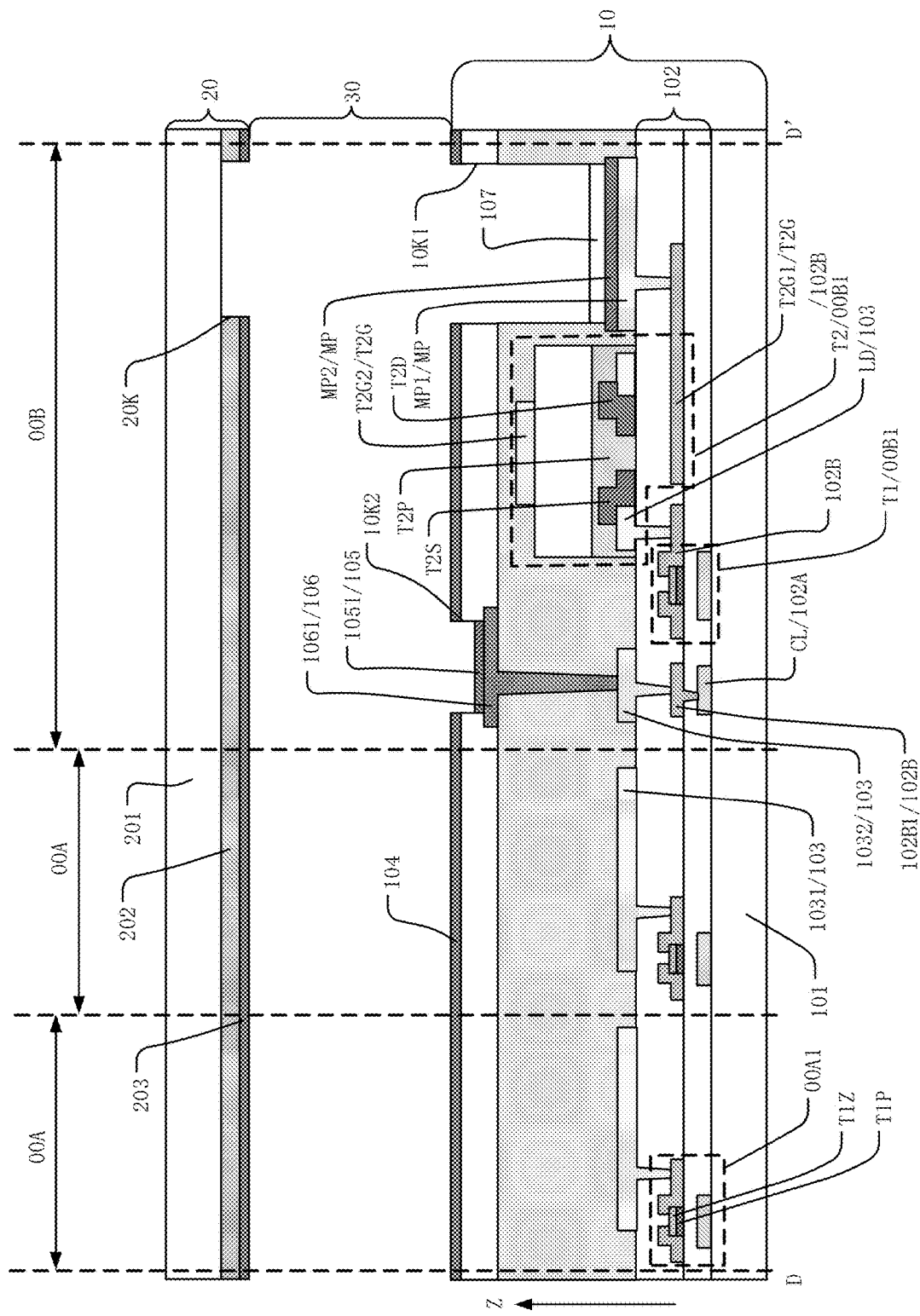
FIG. 17 shows another schematic cross-sectional structural diagram along the D-D' direction in FIG. 8 according to various disclosed embodiments of the present disclosure.
Figure 18:
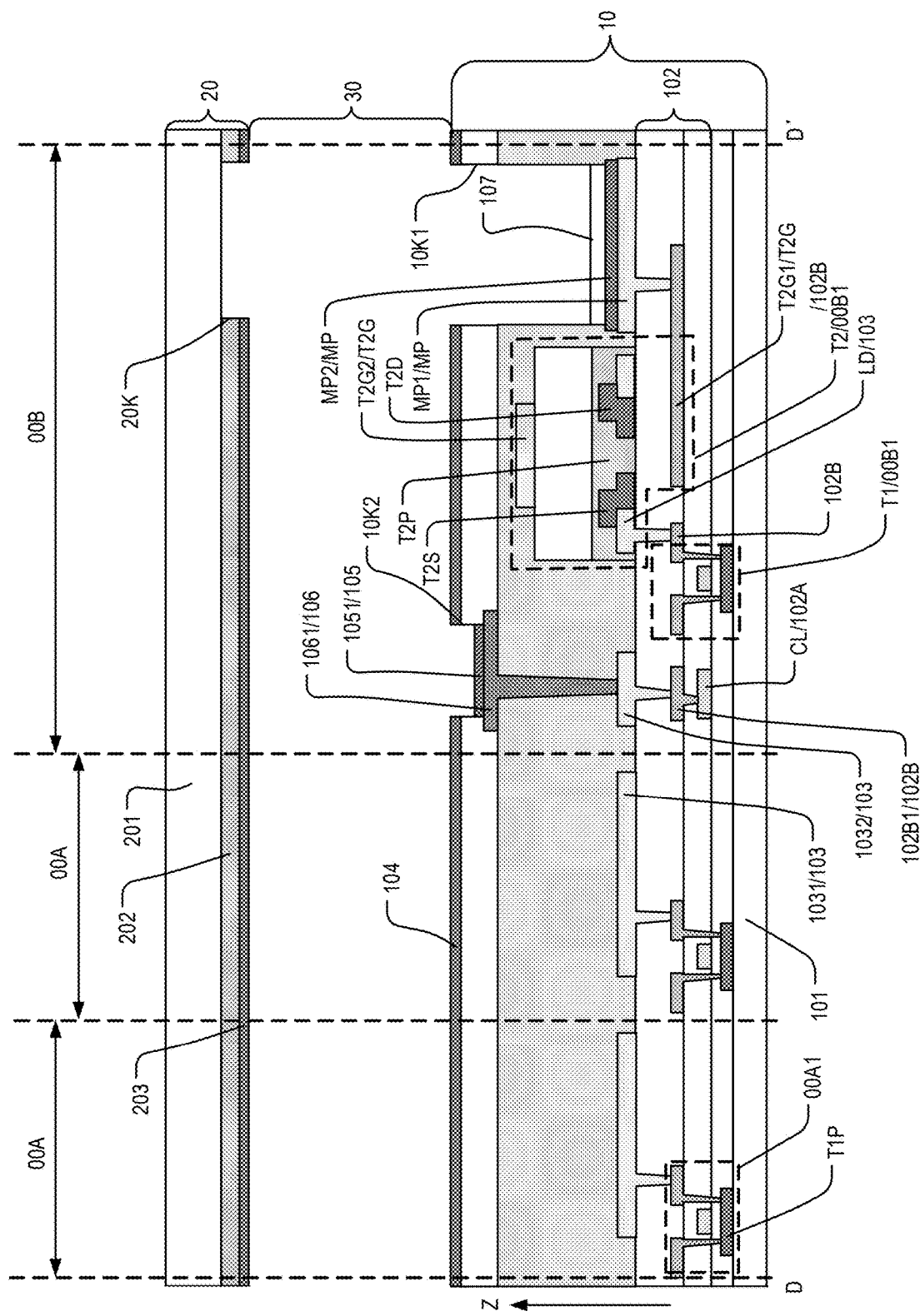
FIG. 18 shows another schematic cross-sectional structural diagram along the D-D' direction in FIG. 8 according to various disclosed embodiments of the present disclosure.

FIGS. 17 and 18 illustrate other schematic cross-sectional structural diagrams along the D-D' direction in FIG. 8 according to the present disclosure. The inorganic transistor T1 at the first base plate 10 includes an active part (inorganic semiconductor part T1P). Fabrication materials of the inorganic semiconductor part T1P may include any one of amorphous silicon, metal oxide, and low-temperature polysilicon.

In some embodiments, the manufacturing material of the inorganic semiconductor part T1P may include amorphous silicon. As shown in FIG. 16, the inorganic transistor T1 may be an amorphous silicon transistor. The inorganic semiconductor part T1P of the inorganic transistor T1 is made of amorphous silicon (a-Si) material. The process is simple and helps improve process efficiency.

In some embodiments, as shown in FIG. 17, the fabrication material of the inorganic semiconductor part T1P of the inorganic transistor T1 at the first base plate 10 includes a metal oxide material. That is, the inorganic transistor T1 may be a metal oxide transistor. The inorganic semiconductor part T1P of the inorganic transistor T1 is a metal oxide material (such as IGZO, indium gallium zinc oxide, or indium gallium zinc oxide). Compared with amorphous silicon transistors, the leakage current of the inorganic transistor T1 may be effectively reduced, which is beneficial to improving the overall detection effect of the micro-fluidic detection device. In some cases, the inorganic semiconductor part T1P of the inorganic transistor T1 is made of metal oxide material. Metal oxide semiconductors are very sensitive to the process and environment. In order to prevent the subsequent process technology and process environment of the inorganic semiconductor part T1P from affecting the performance of the inorganic semiconductor part T1P, an etch stopper T1Z is formed on a side of the inorganic semiconductor part T1P away from the first substrate 101. At the Z direction, the etch stopper T1Z overlaps at least the inorganic semiconductor part T1P of the inorganic transistor T1. Optionally, at the Z direction, the etch stopper T1Z covers at least the inorganic semiconductor part T1P of the inorganic transistor T1 within a channel range, which protects the inorganic semiconductor part T1P, avoids subsequent processes affecting the sensitivity of inorganic transistors made of metal oxide semiconductor materials, and improves detection sensitivity.

In some embodiments, as shown in FIG. 18, the material for making the inorganic semiconductor part T1P of the inorganic transistor T1 in the first base plate 10 includes the low temperature polysilicon material, such as low temperature poly-silicon (LTPS). The inorganic transistor T1 may be a low temperature polysilicon transistor. The inorganic semiconductor part T1P of the inorganic transistor T1 may be made of low-temperature polysilicon materials. The high mobility and high drive speed characteristics of low-temperature polysilicon transistors may be used to improve the response speed of the inorganic transistor T1 and improve the overall detection effect of the micro-fluidic detection device.

As illustrated above, the micro-fluidic detection device provided by the present disclosure at least achieves the following beneficial effects:

The micro-fluidic detection device not only is equipped with the first unit for realizing the movement of droplets for reaction, mixing, sorting, and other operations, but also integrates a second unit for detection such as the sensing the concentration of droplets after the reaction, mixing, sorting, and other operations. The manufacturing process of the detection unit circuit including inorganic transistors may adopt mature inorganic transistor manufacturing technology in the panel field. It has low cost, is easy to implement large-area array preparation, and reduces difficulties in processes such as connecting with external systems and packaging processes. Further, the manufacturing process of inorganic transistors is compatible with the process of the already mature transparent conductive electrodes that may be used as good sensitive electrode materials. The second unit for bio sensing may be integrated into devices with micro-fluidic structures. Moreover, the process has low difficulty levels, which is conducive to improving process efficiency. At the position of the second unit, the first hollow hole at least penetrates the first hydrophobic layer and exposes the sensitive electrode, there is no hydrophobic layer material, and there is higher hydrophilicity. For trace samples in a reacting and detecting process, when a reacted solution sample to be detected is transferred from a first unit to an adjacent second unit, it may be achieved only by the differences in interface hydrophilicity and hydrophobicity. There is no need to control the surface hydrophilicity and hydrophobicity through potentials of electrodes. The second unit may be directly used as a detection point without consuming additional space resources on the substrate. At the micro-fluidic detection device illustrated by the present disclosure, the first unit including the micro-fluidic unit circuit and the second unit including the detection unit circuit are integrated together. Fixed-point, timed, and quantitative biological reactions and accurate detection are realized. It helps greatly reduce the demand for samples and save costs. Further, detection sensitivity may be improved by the detection unit circuit that includes an organic transistor. It is also beneficial for shortening the detection time and improving detection efficiency and detection accuracy. Further, the detection unit circuit includes organic transistors and inorganic transistors that are heterogeneously integrated. An organic transistor layer structure is formed on top of the existing layer structure of inorganic transistors with mature processes. It may also reduce the difficulty of the process and improve the efficiency of the process.

Although some specific embodiments of the present disclosure have been described in detail by way of examples, those skilled in the art will understand that the above examples are for illustration only and are not intended to limit the scope of the present invention. Those skilled in the art will understand that the above embodiments may be modified without departing from the scope and spirit of the invention. The scope of the present disclosure is defined by the appended claims.

What is claimed is:
1. A micro-fluidic detection device, comprising:
a first base plate;
a second base plate opposite to the first base plate; and
a droplet travel layer located between the first and second base plates, wherein the first base plate at least includes:
a first substrate, a drive array layer, a first electrode layer, and a first hydrophobic layer, the drive array layer is located on a side of the first substrate facing the second base plate, the first electrode layer is located on a side of the drive array layer facing the second base plate, the first hydrophobic layer is located on the side of the drive array layer facing the second base plate, the second base plate at least includes:
a second substrate, a second electrode layer, and a second hydrophobic layer, the second electrode layer is located on a side of the second substrate facing the first base plate, the second hydrophobic layer is located on a side of the second electrode layer facing the first base plate, the micro-fluidic detection device further includes:
a plurality of first units and a plurality of second units, wherein the first electrode layer at least includes a plurality of drive electrodes, one of the plurality of drive electrodes is at one of the plurality of first units, the one of the plurality of first units includes a micro-fluidic unit circuit, one of the plurality of second units includes a detection unit circuit, the detection unit circuit and the micro-fluidic unit circuit are located in the drive array layer, the detection unit circuit at least includes:
an inorganic transistor and an organic transistor, the organic transistor at least includes an organic semiconductor part and is electrically connected to a sensitive electrode, the sensitive electrode is located at the one of the plurality of second units, a layer where the sensitive electrode is located is on a side of a layer where the inorganic transistor is located away from the first substrate, and
wherein at the one of the plurality of second units, a side of the first base plate facing the second base plate includes a first hollow hole, and the first hollow hole at least penetrates through the first hydrophobic layer and exposes the sensitive electrode.

2. The device according to claim 1, wherein an orthographic projection area of the one of the plurality of second units on a plane where the first substrate is located is greater than an orthographic projection area of the one of the plurality of first units on the plane where the first substrate is located.

3. The device according to claim 1, wherein along a direction parallel to a plane of the first substrate, there are at least three of the plurality of first units between two adjacent ones of the plurality of second units.

4. The device according to claim 1, wherein at the one of the plurality of second units, a side of the second base plate facing the first base plate includes a second hollow hole, and the second hollow hole at least penetrates the second hydrophobic layer and the second electrode layer.

5. The device according to claim 4, wherein the second base plate at least includes an injection hole, the injection hole at least penetrates the second substrate, the second electrode layer, and the second hydrophobic layer, and a body of the second electrode layer except the second hollow hole and the injection hole forms an integrated connection structure.

6. The device according to claim 1, wherein along a direction perpendicular to a plane of the first substrate, a layer where the organic semiconductor part is located is on a side of a layer where the inorganic transistor is located away from the first base plate.

7. The device according to claim 1, wherein, the first base plate further includes a third electrode layer located on a side of the drive array layer away from the first substrate; at the one of the plurality of second units, the third electrode layer includes a reference electrode; and at the one of the plurality of second units, a side of the first base plate facing the second base plate includes a third hollow hole, and the third hollow hole at least penetrates the first hydrophobic layer and exposes the reference electrode.

8. The device according to claim 7, wherein a fabrication material of the first electrode layer includes a transparent conductive material, and the third electrode layer and the first electrode layer have different fabrication materials.

9. The device according to claim 7, wherein the third electrode layer is located on a side of the first electrode layer away from the first substrate, a connection layer is between the third electrode layer and the first electrode layer, and the connection layer includes a connection portion; and at the one of the plurality of second units, a side of the connecting portion facing the reference electrode is in direct contact with the reference electrode, a side of the connection portion away from the reference electrode is connected to a reference potential reading line, and the reference potential reading line is located in the drive array layer.

10. The device according to claim 7, wherein the reference electrode and another reference electrode at another of the plurality of second units are electrically connected.

11. The device according to claim 1, wherein the sensitive electrode is located in the first electrode layer.

12. The device according to claim 1, wherein a fabrication material of the sensitive electrode is different from a fabrication material of the first electrode layer, and a layer where the sensitive electrode is located is on a side of the first electrode layer away from the first substrate.

13. The device according to claim 12, wherein in the first hollow hole, a side of the sensitive electrode away from the first substrate includes a modification portion.

14. The device according to claim 1, wherein the organic transistor is a dual-gate organic transistor and includes a first gate electrode and a second gate electrode, a layer where the first gate electrode is located is on a side of a layer where the second gate electrode is located facing the first substrate, and the first gate electrode is connected to the sensitive electrode.

15. The device according to claim 14, wherein a bottom gate insulating layer is between a layer where the first gate electrode is located and a layer where the organic semiconductor part of the organic transistor is located, a top gate insulating layer is between a layer where the second gate electrode is located and the layer where the organic semiconductor part of the organic transistor is located, and unit area capacitance of the bottom gate insulating layer is greater than unit area capacitance of the top gate insulating layer.

16. The device according to claim 15, wherein along a direction perpendicular to a plane where the first substrate is located, an overlapping area of the first gate electrode and the organic semiconductor part of the organic transistor is larger than an overlapping area of the second gate electrode and the organic semiconductor part of the organic transistor.

17. The device according to claim 15, wherein a thickness of the bottom gate insulating layer is smaller than a thickness of the top gate insulating layer along a direction perpendicular to a plane where the first substrate is located.

18. The device according to claim 1, wherein a first electrode of the organic transistor is electrically connected to a first electrode of the inorganic transistor, a second electrode of the organic transistor is connected to a first power signal line, and a second electrode of the inorganic transistor is connected to a read signal line.

19. The device according to claim 18, wherein the first electrode of the organic transistor is electrically connected to the first electrode of the inorganic transistor through a first conductive portion, and along a direction perpendicular to a plane where the first substrate is located, a layer where the first conductive portion is located is between a layer where the first electrode of the organic transistor is located and a layer where the first electrode of the inorganic transistor is located.

20. The device according to claim 19, wherein the first conductive portion is located in the first electrode layer.

\* \* \* \* \*